US005622248A

United States Patent [19]

[11] Patent Number: 5,622,248
[45] Date of Patent: Apr. 22, 1997

Villaverde, Sr. et al.

[54] ADJUSTABLE CONTAINER FEEDING SYSTEM FOR PRINTING PRESSES

[75] Inventors: Fernando Villaverde, Sr.; Fernando Villaverde, Jr., both of Piscataway, N.J.

[73] Assignee: F & L Machinery Design, Inc., Edison, N.J.

[21] Appl. No.: 517,703

[22] Filed: Aug. 22, 1995

[51] Int. Cl.[6] ............................ B65G 47/22; B65G 33/06
[52] U.S. Cl. ............................ 198/493; 198/625
[58] Field of Search ............................ 198/625, 493, 198/467.1, 459.3; 414/495.5, 797.5, 797.7

[56] References Cited

U.S. PATENT DOCUMENTS

| | | | |
|---|---|---|---|
| 2,184,029 | 12/1939 | Wicklund | 414/797.7 |
| 3,856,131 | 12/1974 | Flamand et al. | 198/467.1 |
| 3,945,682 | 3/1976 | Hoagland et al. | 198/493 |
| 4,950,120 | 8/1990 | Barnes | 414/797.7 |
| 5,064,093 | 11/1991 | Davis et al. | 414/797.7 |
| 5,248,045 | 9/1993 | Alvelda | 198/493 |

*Primary Examiner*—William E. Terrell
*Assistant Examiner*—Richard A. Chandler
*Attorney, Agent, or Firm*—Ezra Sutton

[57] ABSTRACT

An apparatus for engaging and feeding containers to a printing press, including a support frame having a plurality of shafts mounted thereon; a plurality of worm members mounted on the shafts and each having spiral grooves for engaging a bead of a container, the worm members being movable between a first position for engaging the bead of a container and a second position disengaged from the bead of the container. In addition, the container feeding apparatus includes a feeder tube mounted on the support frame for setting and controlling the location of the first position of the worm members and for supplying the containers to the worm members. There are also a plurality of worm block assemblies mounted within the support frame each including drive means for rotating one of the plurality of worm members while in the first position to simultaneously engage the bead of the container to move the container forward relative to the feeder tube to the end of the spiral grooves. The container feeding apparatus further includes a pneumatic air assembly for injecting air at the container for transferring the container from the end of the spiral grooves to a mandrel for receiving the container for printing; and a cylinder pivot assembly for moving the worm block assemblies between the first and second positions.

18 Claims, 22 Drawing Sheets

ADJUSTABLE CONTAINER FEEDING SYSTEM FOR PRINTING PRESSES

FIELD OF THE INVENTION

This invention relates to an automatic, adjustable and pneumatically integrated container feeding system for dry offset printing presses. More particularly, this apparatus is a screw-type feeder system which is utilized for many different container sizes and shapes.

BACKGROUND OF THE INVENTION

Present air-blown, screw-type container or cup feeding systems for dry off-set printing presses operate using four cup-engaging worm members having a plurality of guide rails, along with an air-jet system for blowing each cup or container onto a holding mandrel for printing of indicia on the outside surface of the container.

In present feeding systems, the operator inserts the container to be printed between the four worm members and manually adjusts the four worm screws until they are spaced apart at the same diameter of the container to be fed, so they engage the lip of the container. The operator then adjusts the four blow-off air arms to the correct location for seating the container on the mandrel, ready for offset printing. All of these manual adjustments vary with the particular operator, thus causing inconsistent container feeding, which causes container feeding jams. There are additional drawbacks. The previous feeding systems of this type were only hand-adjustable, such that the air-jets had to be constantly adjusted to blow-off each container out of the feeding system, and this caused constant jamming of the apparatus. In order to clear a jam, the operator had to manually crank a handle to back away the cup-engaging worm members and then reset the misaligned air-jets and guide arms of the feeding system to their previous position by operator "feel". This causes additional problems as each operator adjusts the system differently, with the end result being more inconsistent feeding of the containers. This in turn causes more jams, which translates to more misalignment of the air-jets and guide arms, as they become bent or broken, which causes large amounts of scrap containers being produced by present feeding systems. Thus, present systems are not cost effective or efficient.

There remains a need for an improved container feeding system that is automatic and adjustable, capable of feeding a single container at a time to the printing mandrel every time, with no variation. This would eliminate operator error or variations in setting up for different container sizes. Such a feeding system would also be utilized for all types of printing presses.

DESCRIPTION OF THE PRIOR ART

Container feeding systems of various types have been disclosed in the prior art, including free fall, belt grabbing, chain holding, plate wheel holding and air-blown feeding systems. For example, U.S. Pat. Nos. 3,035,515; 3,054,496; and 3,269,305 disclose worm screw feeder systems for package imprinting apparatus which imprint on a plurality of packages, containers or the like.

U.S. Pat. Nos. 3,973,485; 5,193,456; 5,231,926; 5,265,532 and 5,337,659 disclose non-worm screw type feeder systems such as air blown, belt grabbing, and plate wheel holding feeding systems for container imprinting.

None of the aforementioned patents disclose a feeding apparatus for container or cup imprinting which overcome the drawbacks of the prior art described above.

Accordingly, it is an object of the present invention to provide an automatic, adjustable and pneumatically integrated container feeding system for dry offset printing presses which can be utilized for different container sizes and shapes, with the benefit of increased efficiency due to lower maintenance and labor costs during change-overs for different container sizes and shapes.

Another object of the present invention is to provide a container feeding system that utilizes an integrated pneumatic system which automatically adjusts for the container diameter chosen, thereby effectively eliminating operator error and variations for the different container diameters.

Another object of the present invention is to provide a container feeding system that minimizes down time and labor costs by enabling quick removal of jams.

Another object of the present invention is to provide a container feeding system that minimizes change-over time and set-up time by automatically and simultaneously adjusting the position of all of the cup-engaging worm members.

A further object of the present invention is to provide a container feeding system that is simple to manufacture and assemble and is also more cost efficient during operational use.

SUMMARY OF THE INVENTION

The present invention provides an adjustable container engaging feeding system used for off-set printing of containers of different sizes and shapes, such that this apparatus feeds only a single container to a mandrel every time for printing of indicia on the outside wall of the container.

This apparatus for engaging and feeding containers to a printing press, includes a worm block assembly having a plurality of worm members with spiral grooves for engaging a bead of a container. The worm members are movable between a first position for engaging the bead or lip and a second position disengaged from the bead or lip of the container. The feeding system has a feeder tube for setting and controlling the location of the first position of the worm members.

The feeding system also includes means for moving the worm block assembly between the first and second positions, and means for rotating the plurality of worm members while in the first position to simultaneously engage the bead or lip of the container and to move the container forward to the end of the spiral grooves. There are also means for injecting air at the container for transferring the container from the end of the spiral grooves to a mandrel for receiving the container for printing of indicia on the outside wall of the container.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENTS

OVERVIEW

Figure 1:
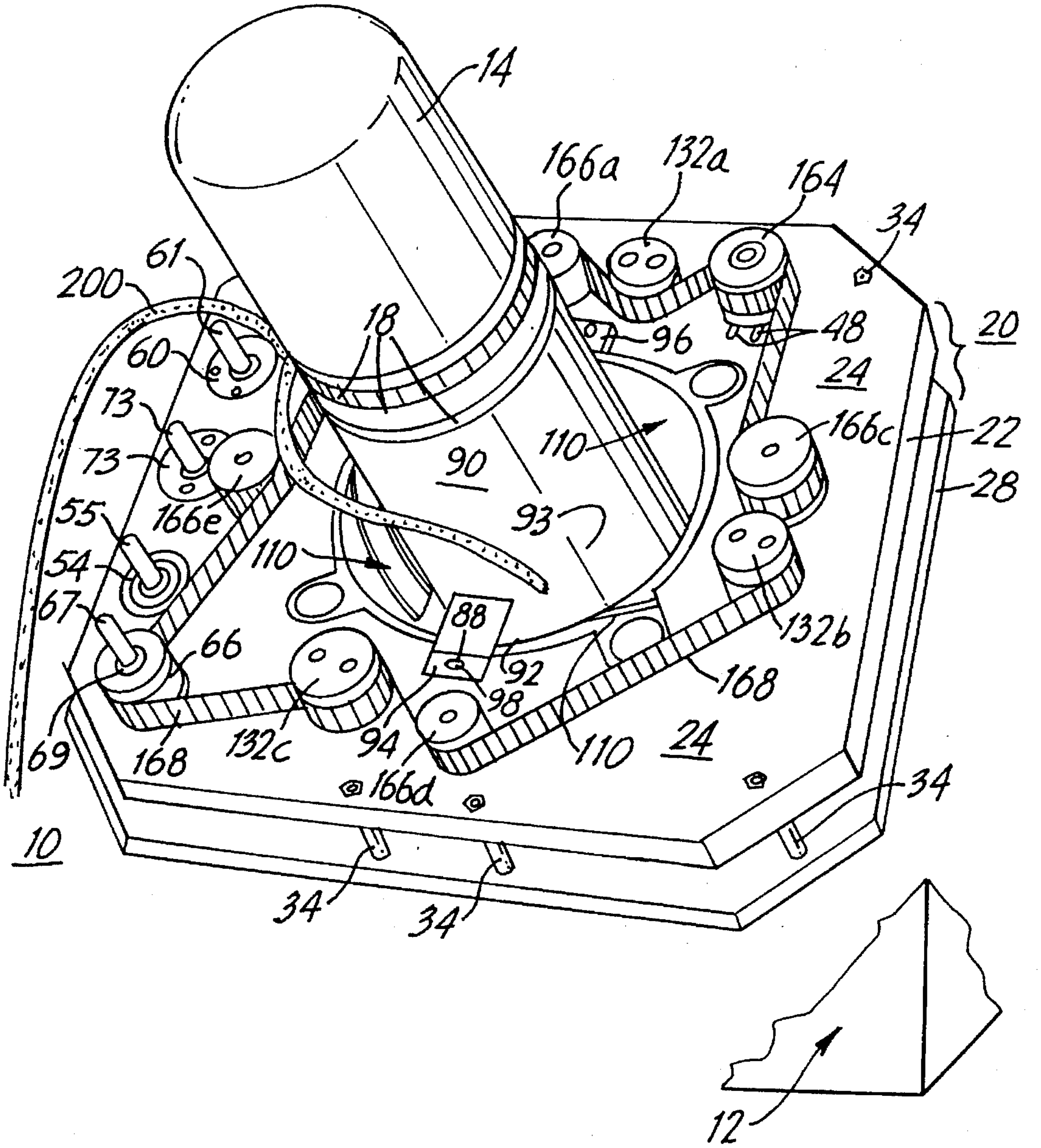
FIG. 1 is a top perspective view of the container feeding system of the present invention showing the assembled apparatus with containers being in the container feeder tube.
Figure 2:
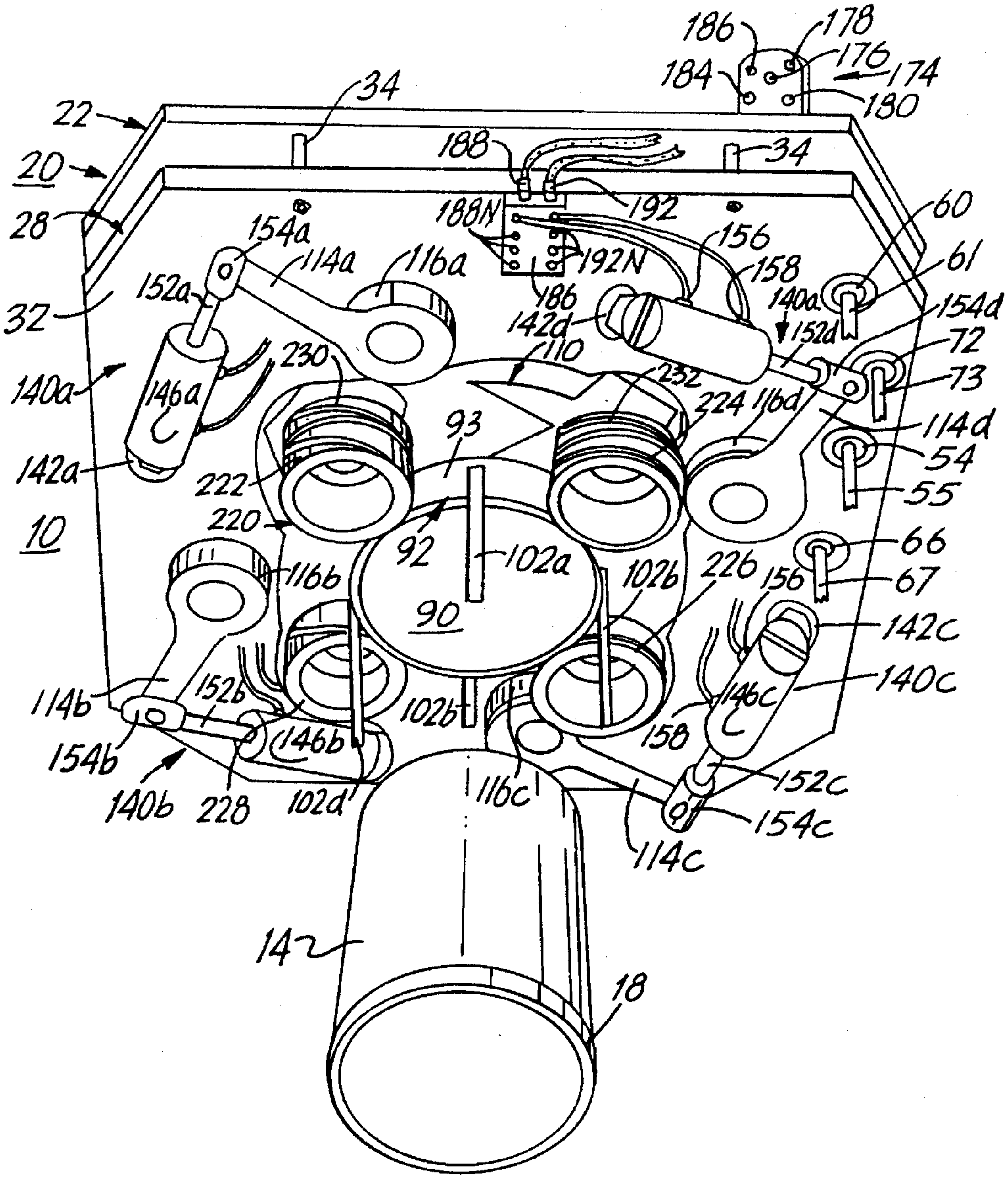
FIG. 2 is a rear perspective view of the container feeding system of the present invention showing the container being fed out from the container feeder tube in the assembled condition.
Figure 3:
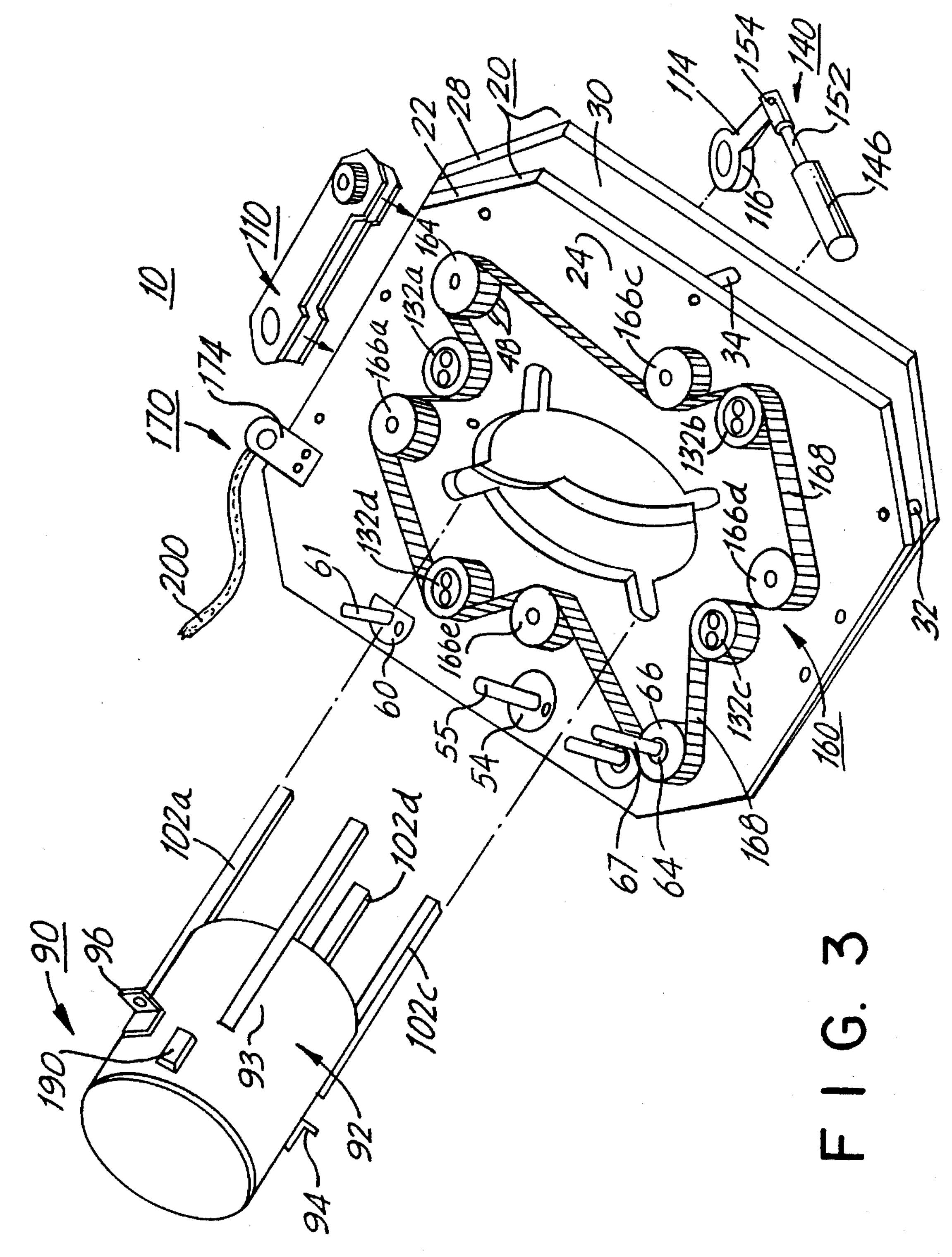
FIG. 3 is an exploded perspective view of the container feeding system showing the apparatus and its major component assemblies.

The adjustable container feeding system and its component parts of the preferred and alternate embodiments of the present invention, which are used in conjunction with a dry offset printing press 12, are shown in detail in FIGS. 1 through 26. The container feeding system 10, as shown in FIGS. 1 to 10, comprises a support frame assembly 20 for housing the major component assemblies and parts; a feeder tube assembly 90 for holding the containers 14; a worm block assembly 110 for engaging a container 14 or cup 16 and moving it one at a time to the printing press 12; a plurality of cylinder pivot assemblies 140 for cylinder compression movement; an idler pulley assembly 160 for transferring the intended motion of the motor drive shaft 67 to the timing pulleys 128; a pneumatic air assembly 170 for providing pressurized air to the cylinder pivot assemblies 140; and a container-engaging worm assembly 220 for moving a single container 14 forward for printing on the printing press 12. These aforementioned assemblies 20, 90, 110, 140, 160, 170, and 220 of the container feeding system 10 are adjuncts to the dry offset printing press 12. The feeding system 10 of the present invention and its alternative embodiments 300 insure the proper printing of indicia on the exterior surface of any container 14 or cup 16 without any jamming or other breakdown of the feeding system 10.

SUPPORT FRAME ASSEMBLY 20

The support frame assembly 20, as depicted in FIGS. 1 through 10, includes a front steel plate 22 and a rear steel plate 28 being spaced apart by a plurality of spacer bolts 34, seven in number. These spacer bolts 34 are bolted to the front and rear steel plates 22 and 28 via spacer openings **36*a* through 36*g* and 38*a* through 38*g*. The support frame assembly 20 is substantially squared-shaped and provides for the mounting and interaction of all the other assemblies 90, 110, 140, 160, 170, and 220 of the feeding system 10**.

The support frame assembly 20, in an assembled condition, measures 19.5 inches in width, 19.0 inches in height and 2.75 inches in thickness, with a tolerance of ±10.03 inches. The front steel plate 22 thickness is 5/16 of an inch and the rear steel plate 28 thickness is ¼ of an inch.

Figure 8:
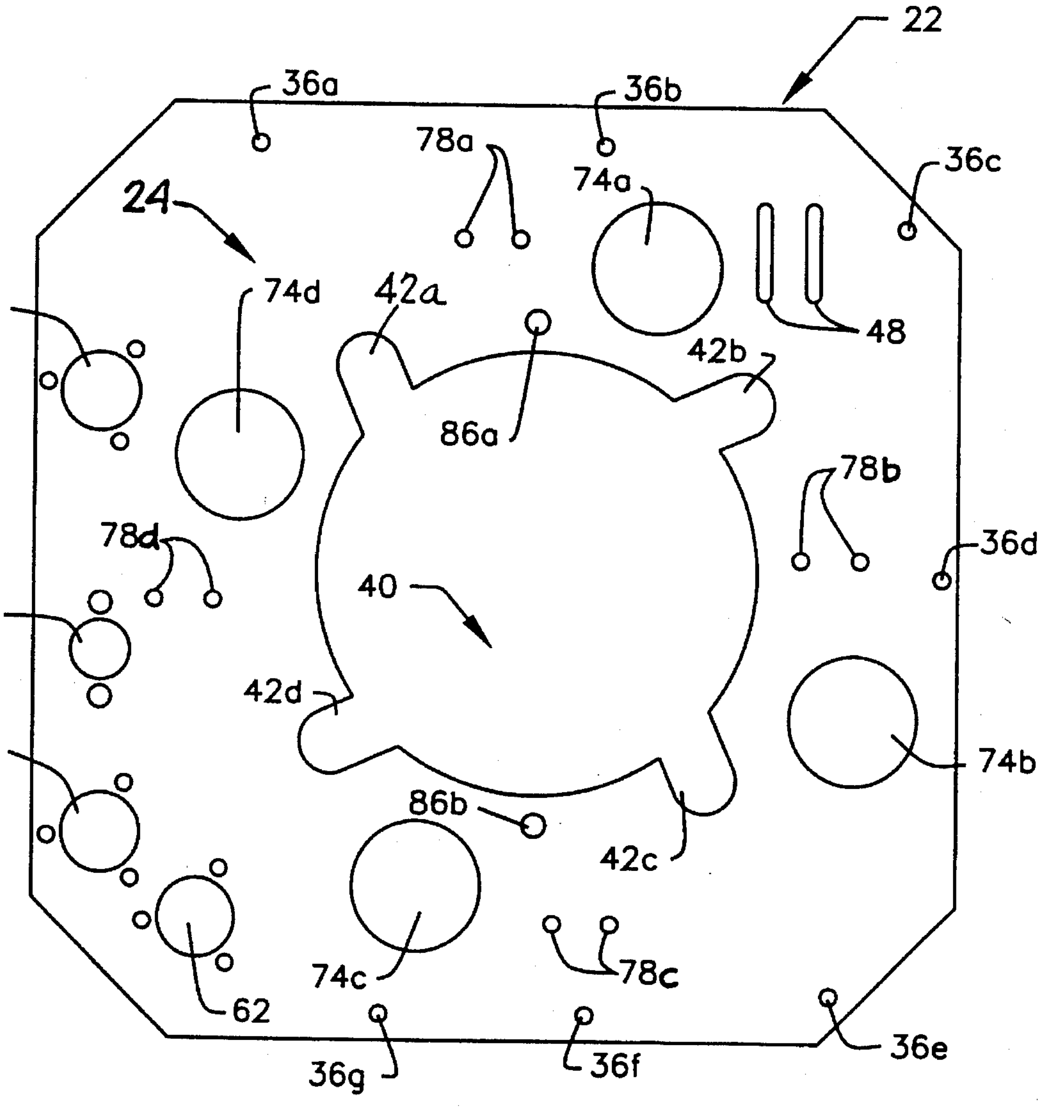
FIG. 8 is a top view of the front plate of the support frame assembly.

The front plate 22 has top and bottom surface areas 24 and 26 having a plurality of different size openings therein for receiving various component parts of the feeding system 10. As best shown in FIG. 8, the front plate 22 has a large central opening 40 for receiving the container feeder tube 92 or the alternate cup feeder tube 392, as well as adjacent cut out openings **42*a*, 42*b*, 42*c*, and 42*d* integral with opening 40**, for visually seeing the top-surface portion of the worm shaft 120 and its component parts. In addition, front plate 22 has left and right shaft bushing openings 50 and 56, a motor drive shaft block opening 62, a height adjustment block opening 68, and a plurality of four timing hub openings 74*a* through 74*d*. In addition, plate 22 has a plurality of paired sets of idler pulley stud openings 78*a* through 78*d* for mounting of the idler pulley studs 82 by idler pulley stud bolts 80; a pair of slot openings 48 for the take-up idler pulley 164 of idler pulley timing belt 168; and support arm openings 86*a* and 86*b* for attaching the container or cup feeder tubes 92 or 392 to front plate 22 by support arm bolts 88.

Figure 9:
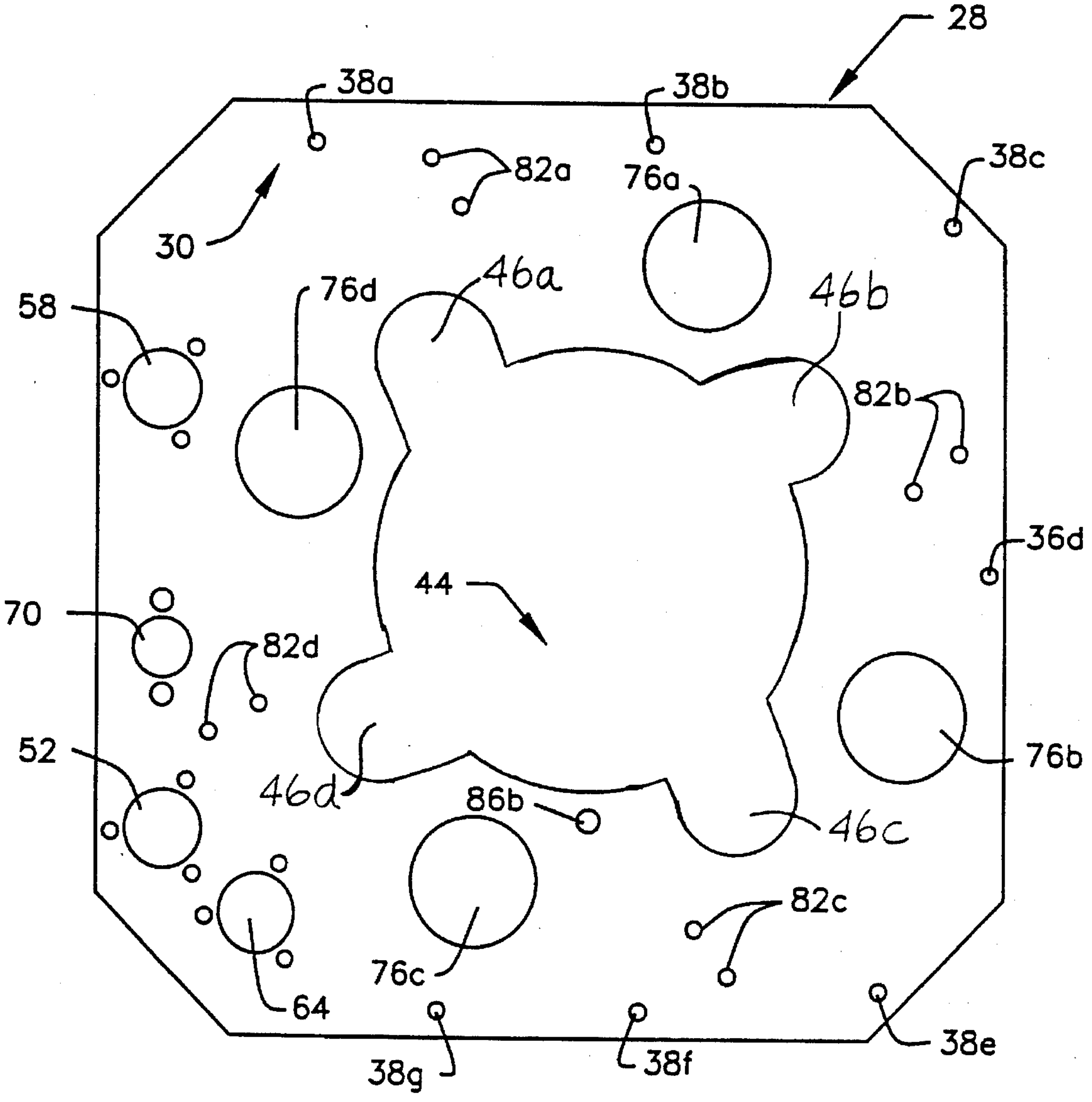
FIG. 9 is a top view of the rear plate of the support frame assembly.
Figure 10:
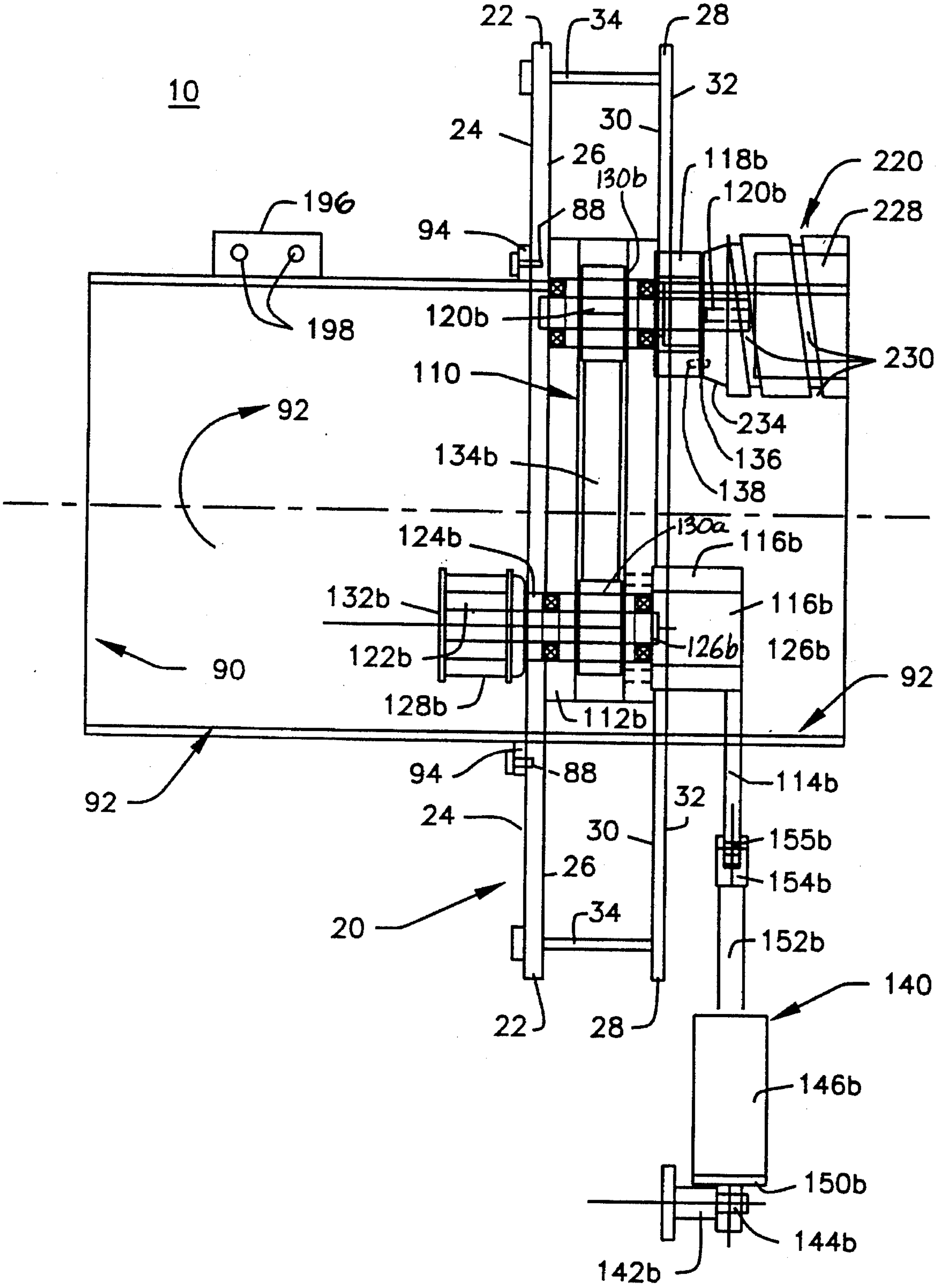
FIG. 10 is a vertical sectional view of the container feeding system, taken along the section line 10—10 of FIG. 4, showing some of the component parts mounted on and between the front and rear plates of the support frame assembly.
Figure 11:
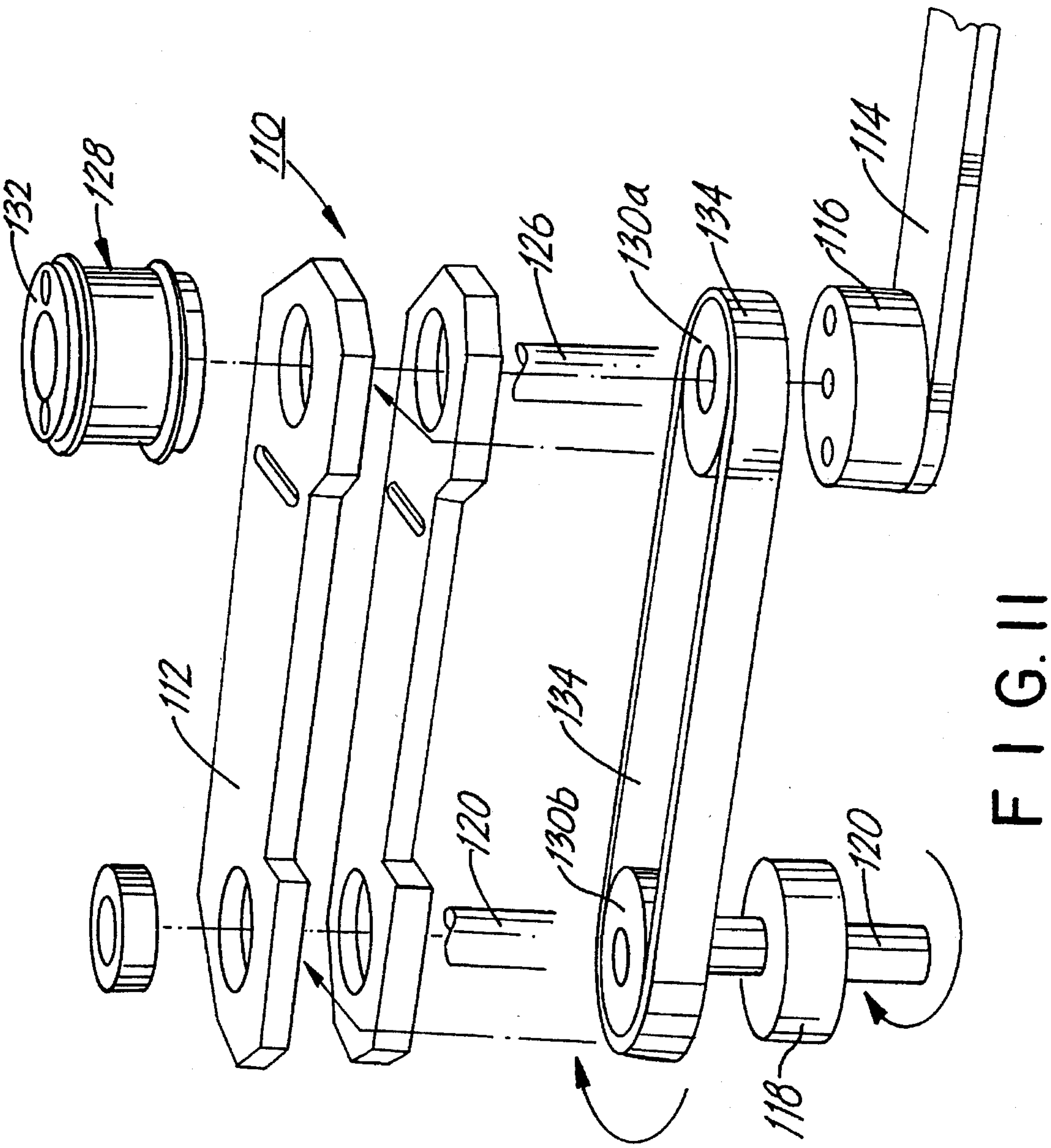
FIG. 11 is an exploded perspective top view of the worm block assembly showing its component parts.

As shown in FIG. 9, the rear plate 28 has top and bottom surface areas 30 and 32 having a plurality of different size openings therein for receiving various component parts of the feeding system 10. The rear plate 28 has a large central opening 44 for receiving the container feeder tube 92 or the alternate cup feeder tube 392, as well as adjacent clearance cut-out openings 46*a*, 46*b*, 46*c*, and 46*d* integral to opening 44. As explained below, this allows the clearance for the worm spacer/stops 118 to be backed away, when the pneumatic air system 170 is in the disengaged position 204. This also allows the worm spacers 118 within the worm-blocks 112 to move out to their farthest position on the openings 46*a* through 46*d*. In addition, there are left and right shaft bushing openings 52 and 58, a motor drive shaft block opening 64, a height adjustment block opening 70, and four pivot arm openings 76*a* through 76*d*. Also, there are a plurality of paired sets of cylinder pivot stud mounting openings 82*a* through 82*d* for the mounting of the cylinder pivot studs 142 by pivot stud bolts 143.

Figure 4:
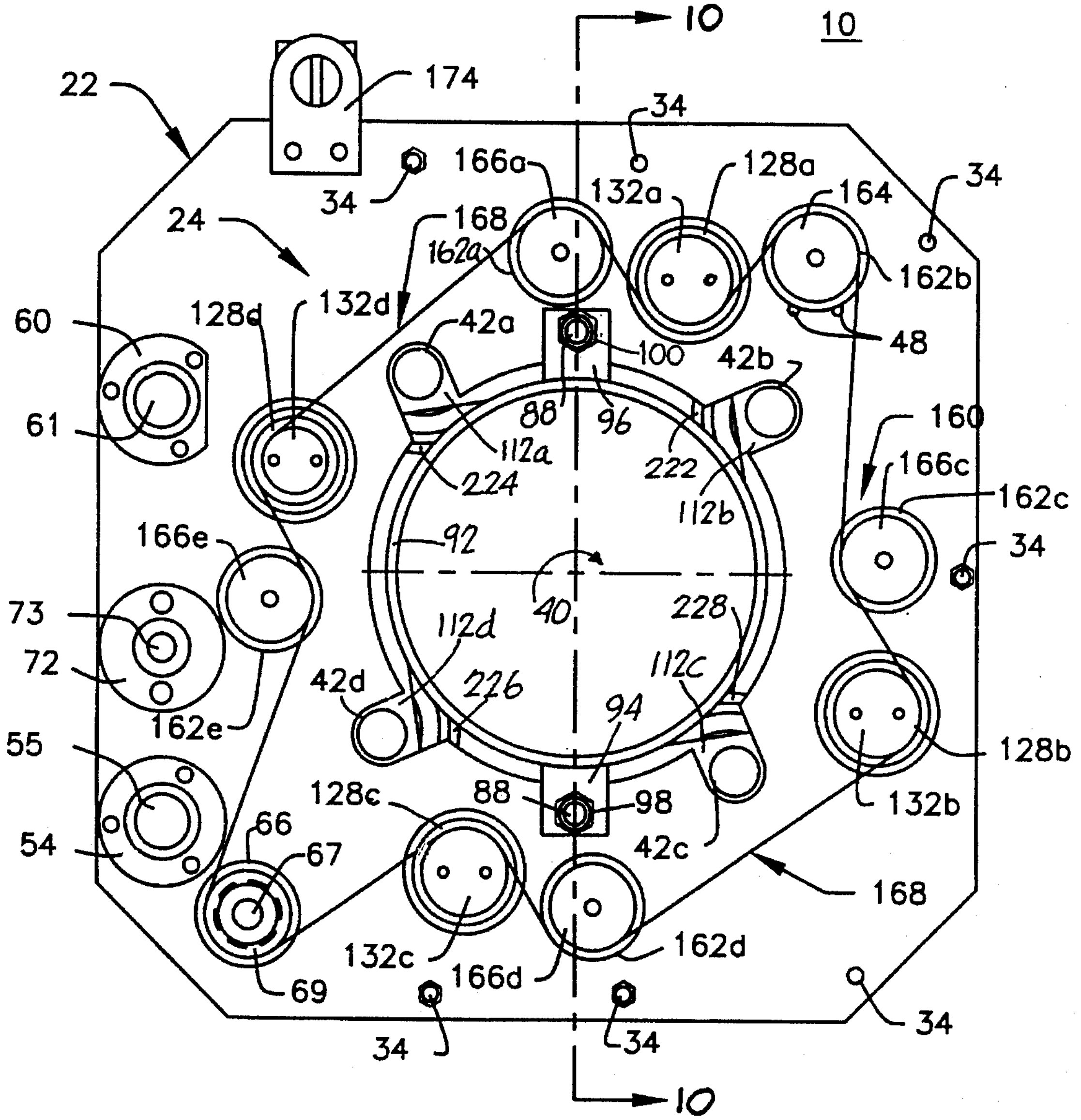
FIG. 4 is a top view of the container feeding system showing the container feeder tube and other component parts being on the front plate (top side) of the support frame assembly.

When the feeding system 10 is in its assembled state, it is aligned with and mounted on the printing press 12, such that the support frame assembly 20 is mounted on the alignment shafts 55 and 61, the motor drive shaft 67 and the height adjustment shaft 73. As shown in FIGS. 1 and 4, the left alignment shaft 55 is slid through the left shaft bushing 54 and openings 50 and 52, while the right alignment shaft 61 is slid through the right shaft bushing 60 and openings 56 and 58. The shaft bushings 54 and 60 are mounted in left and right shaft openings 50, 52 and 56, 58 of front and rear plates 22, 28 of frame support assembly 20. The motor drive shaft 67 is slid through the aluminum motor drive shaft block 66, where shaft block 66 is mounted in the motor drive shaft block openings 62, 64 of front and rear plates 22, 28 of frame support assembly 20. The height adjustment threaded shaft 73 is slid through the threaded shaft block 72, where shaft block 72 is mounted in the height adjustment block openings 68, 70 of front and rear plates 22, 28 of frame support assembly 20.

FEEDER TUBE ASSEMBLY 90

The feeder tube assembly 90 includes an elongated, cylindrical container feeder tube 92 which is mounted in central openings 40 and 44 of the support frame assembly 20, as shown in FIGS. 1, 2, 4, 5, 6, and 10. The container feeder tube 92 at one open end has integral left and right attachment support arms 94, 96 with mounting openings 98, 100 which are aligned with the support arm openings 86*a*, 86*b* on front plate 22 and are attached thereto by two support arm bolts 88 which firmly attaches the container feeder tube 92 to the front plate 22.

Figure 20:
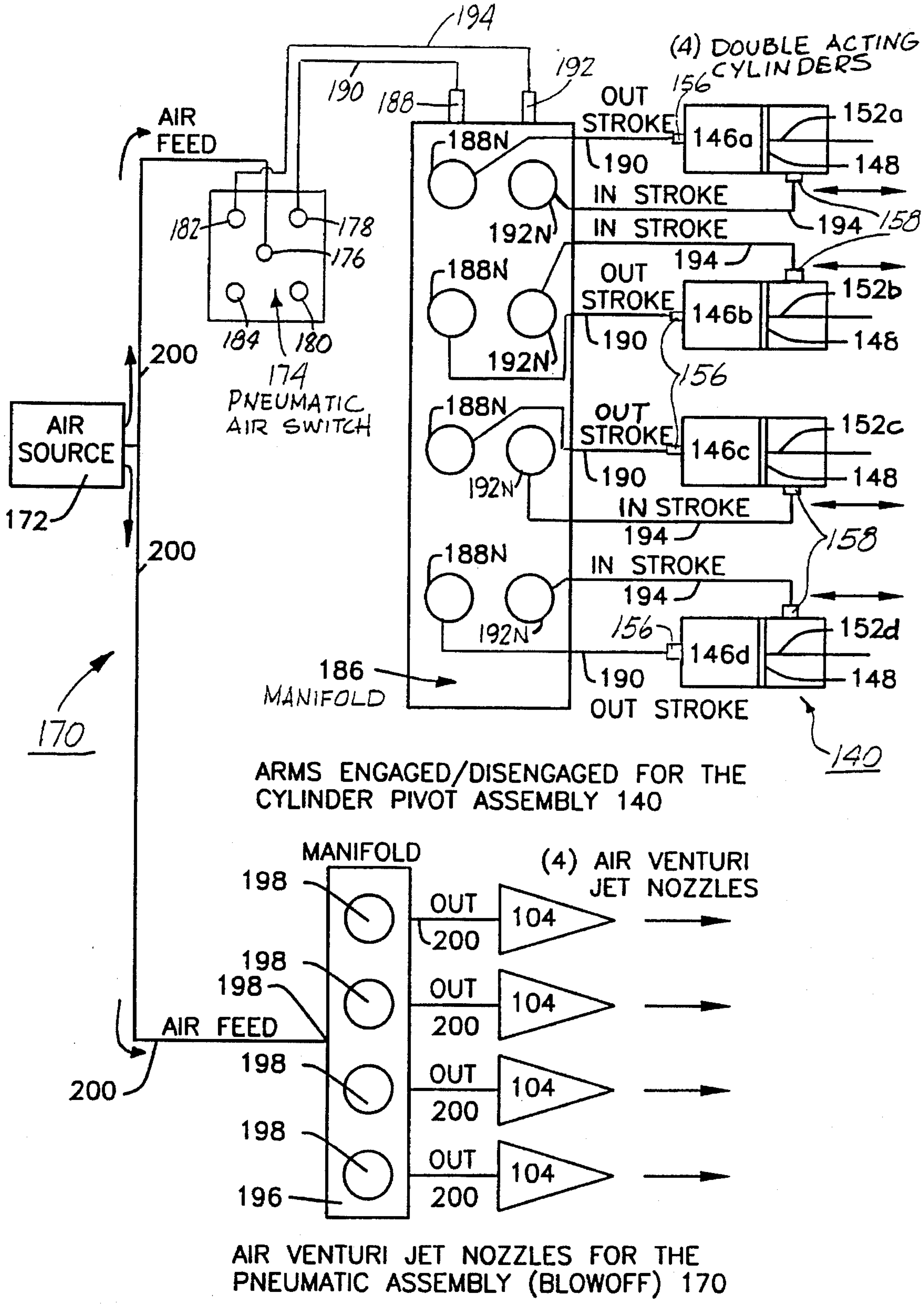
FIG. 20 is a schematic representation of the pneumatic air assembly system showing the air flow to the cylinder pivot assembly and feeder tube assembly.
Figure 21:
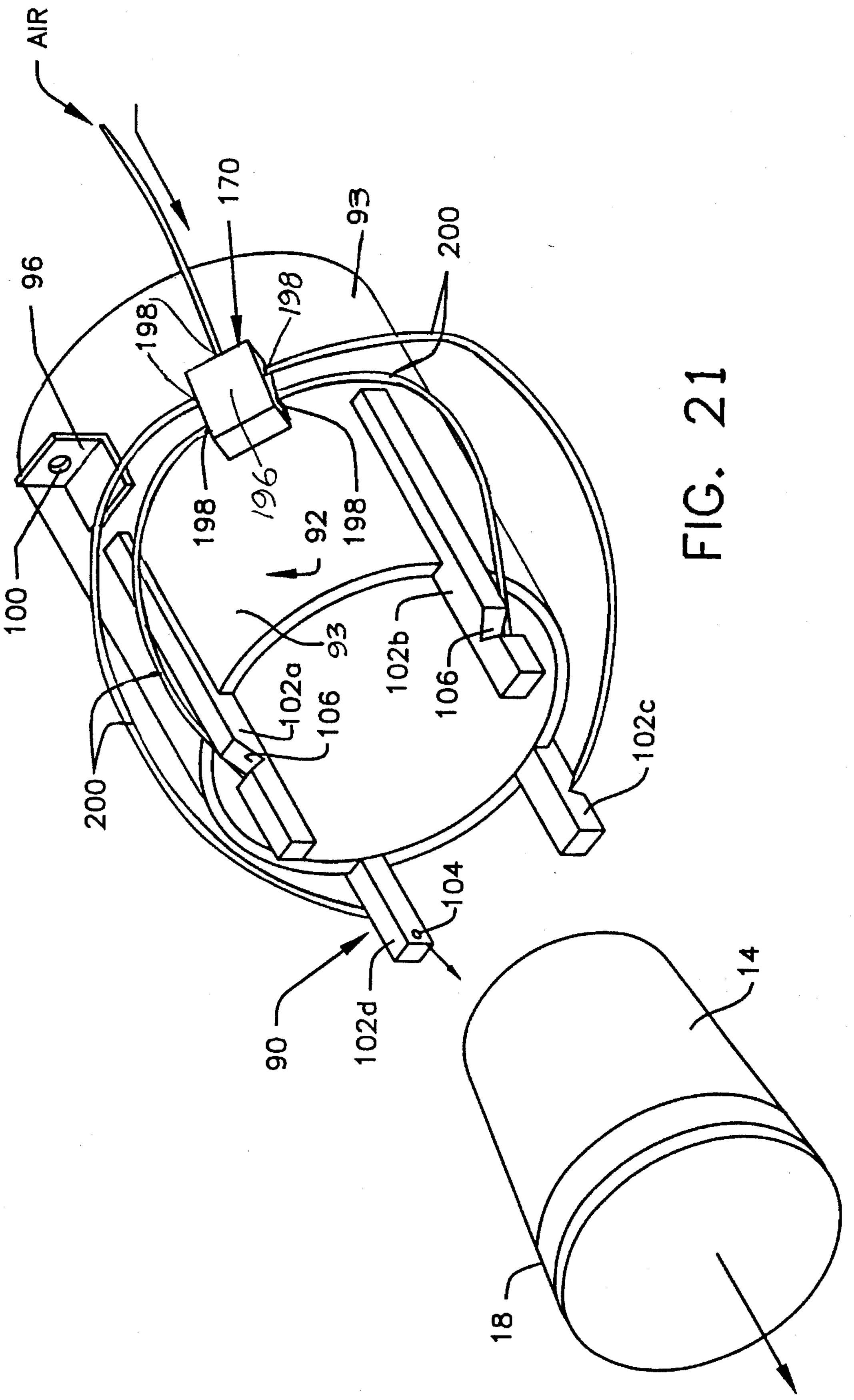
FIG. 21 is a perspective view of the feeder tube assembly showing the air manifold, air-inlet lines and jet arms with nozzles to blow off a container.
Figure 26:
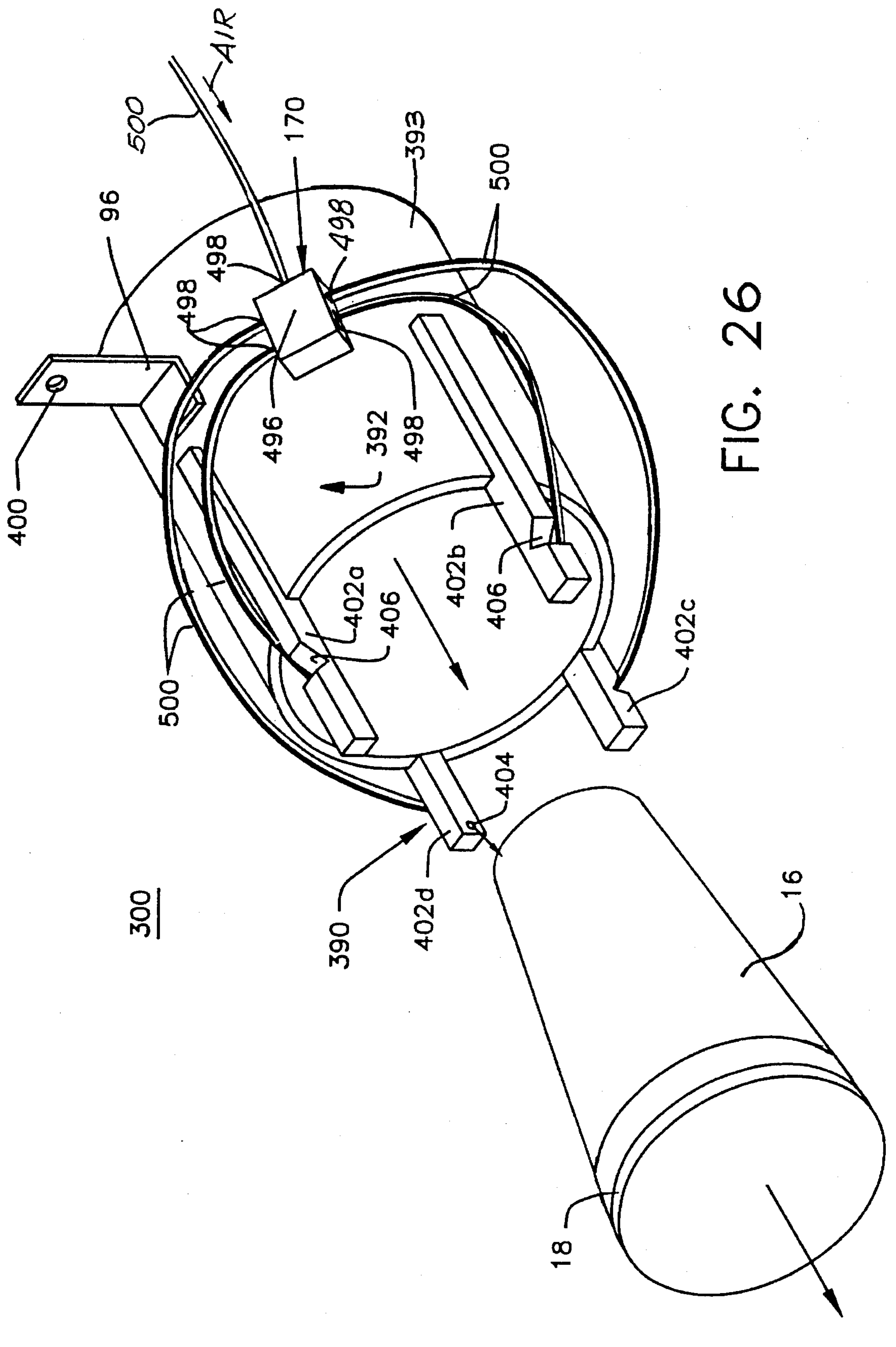
FIG. 26 is a perspective view of an alternate embodiment of the feeder tube assembly showing the air manifold, air-inlet lines and jet arms with nozzles which are used to blow-off an elongated cup.

As shown in FIG. 21, located at the other open end of feeder tube 92 are four venturi jet arms 102, being equally spaced around feeder tube 92. Each venturi jet arm. 102 has a venturi jet nozzle aperture 104 to blow air at a container 14 and move it from the feeder tube 92 onto the mandrel of the printing press 12. The apertures 104 blow the air at approximately a 45° angle to container 14. As described below, an air-inlet connector opening 106 for an air-inlet tube 200 supplies the blow-off air to nozzles 104, as depicted in FIGS. 20, 21, and 26 of the drawings. The container feeder tube 92 for this preferred embodiment measures 10 inches in length and has a diameter opening of 7⅜ inches.

WORM BLOCK ASSEMBLY 110

There are four worm block assemblies 110, as depicted in FIGS. 6, 10, 11, and 12, mounted on plates 22 and 28 and passing through openings 74*a* to 74*d* and 76*a* to 76*d* includes a worm block housing 112 made of aluminum, that includes a cylinder pivot arm 114, a pivot arm spacer 116, a worm spacer/stop 118, a worm shaft 120, a timing pulley hub 122, a pulley hub spacer 124, a timing pulley shaft 126, a timing pulley 128, a pair of worm drive pulleys 130*a* and 130*b*, a timing pulley lock mechanism 132 and a heavy duty flexible timing belt 134.

Figure 12:
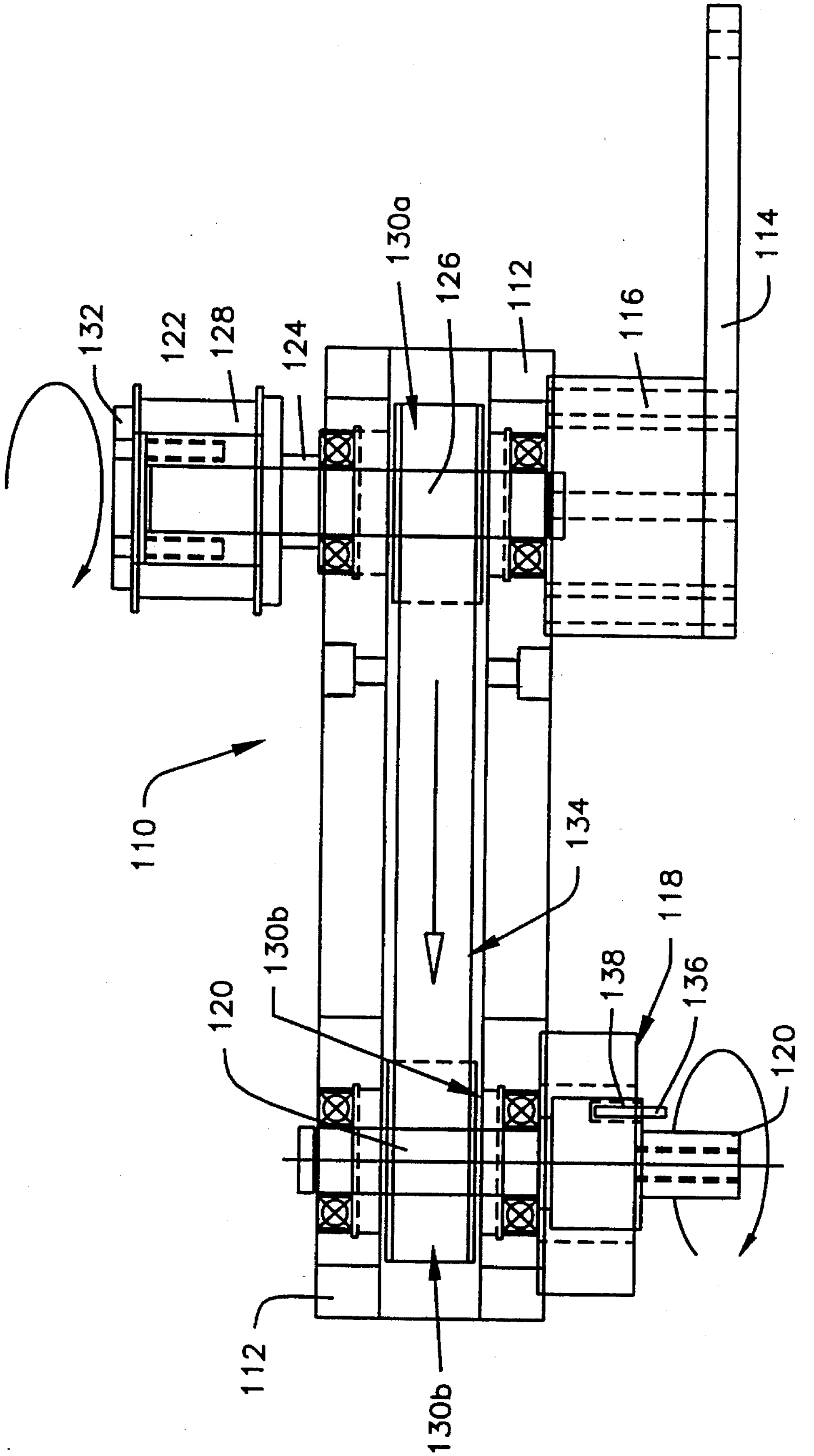
FIG. 12 is a side view of the worm block assembly showing its component parts in their assembled positions.

As shown in FIG. 12, the worm spacer 118 includes a timing pin opening 138 for receiving a timing pin 136 which is aligned with the worm timing pin opening 234 of engaging worm members 222, 224, 226, and 228. The timing pin 136 alignment between the worm spacers/stops 118*a*, 118*b*, 118*c*, and 118*d* and container engaging worm members 222, 224, 226, and 228 enables all of the worm members 222, 224, 226, and 228 to engage the lip 18 of container 14 all at the same starting point of spiral grooves 230 and 232. The movement of the lip 18 through spiral grooves 230 and 232 insures that only a single container is moved forward from feeder tube 92.

Figure 6:
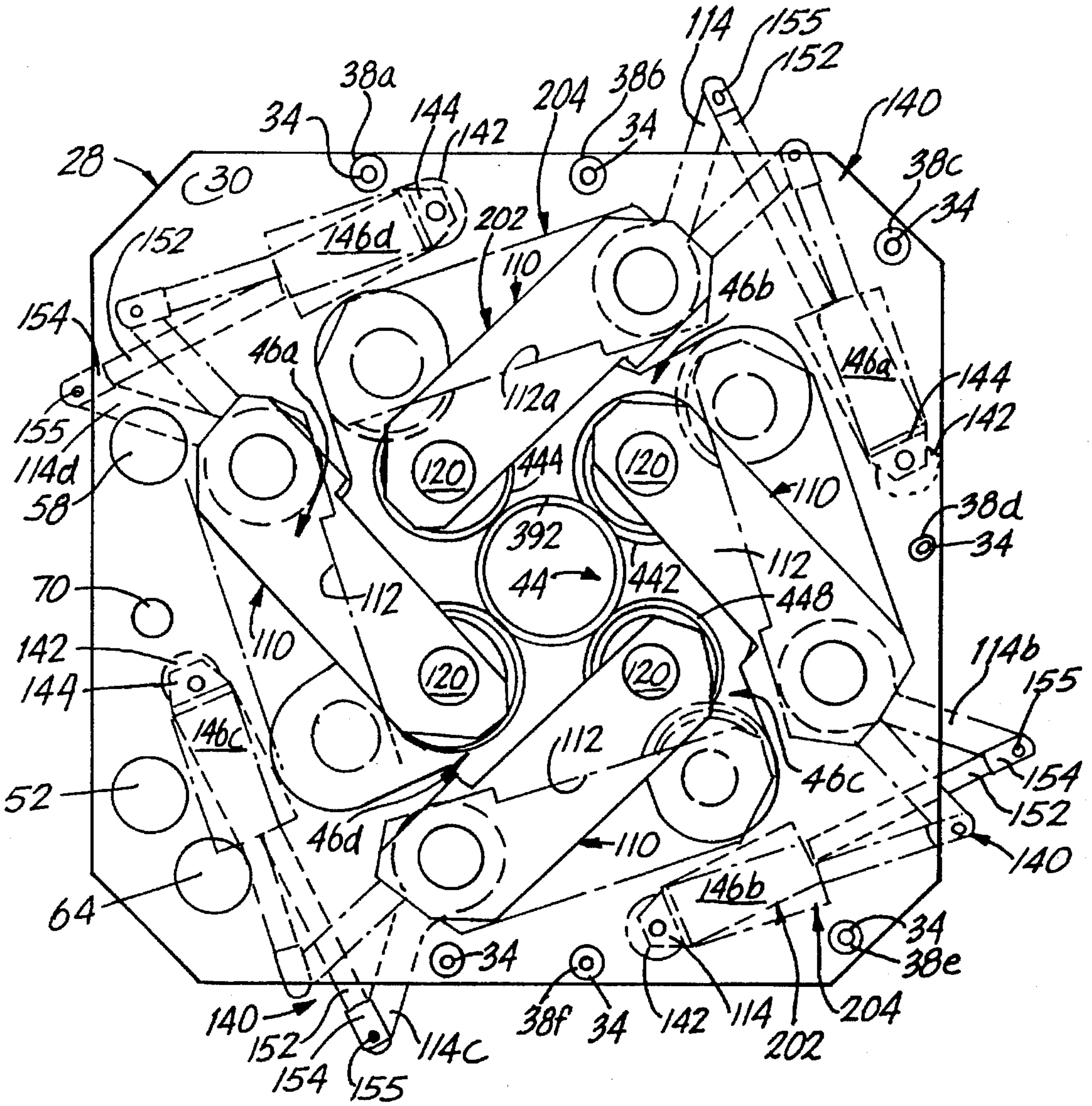
FIG. 6 is a top view of the rear plate showing the worm block assembly and the cylinder pivot assembly which depicts the interaction of the two assemblies in the engaged and disengaged positions.
Figure 7:
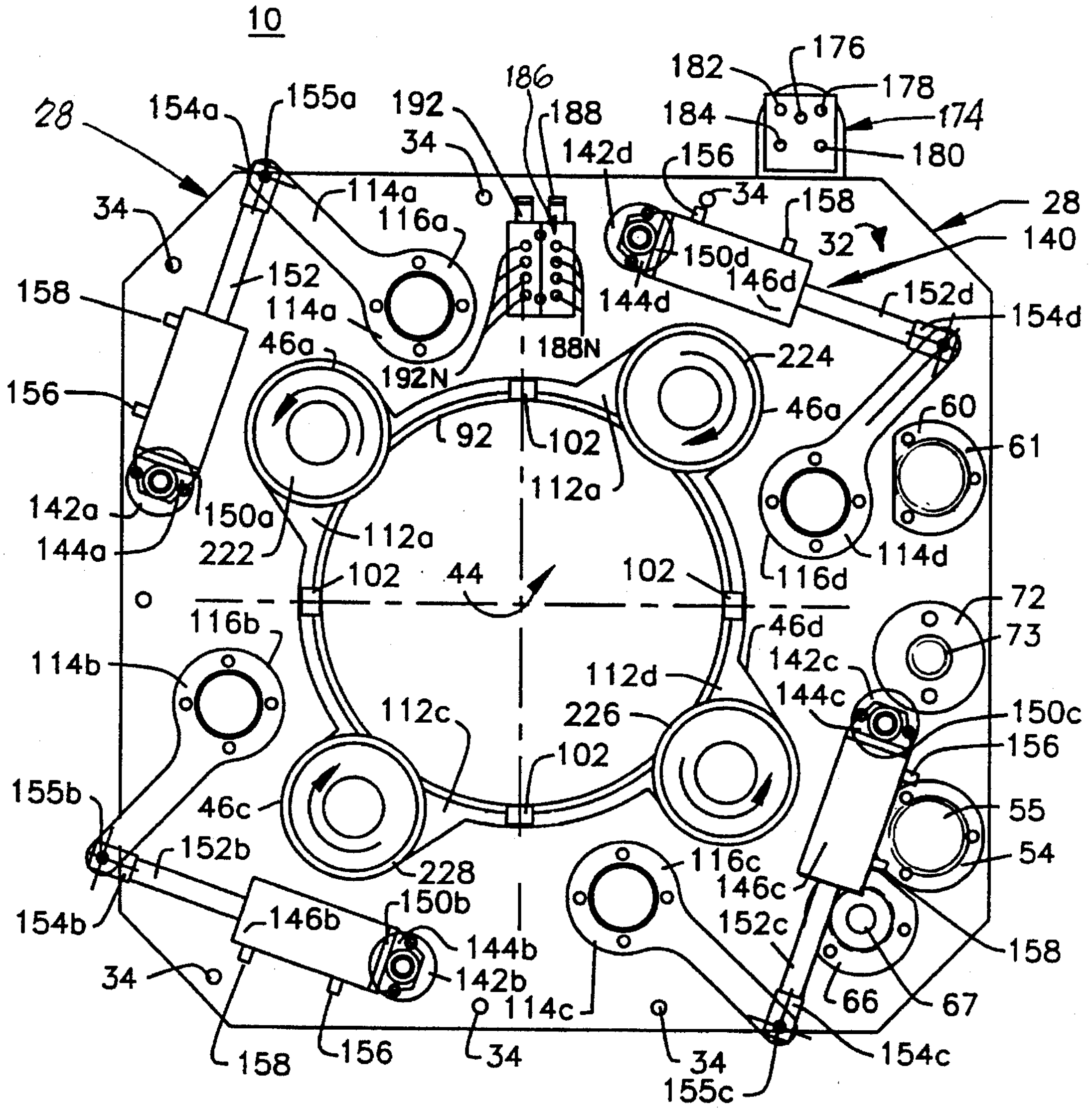
FIG. 7 is a rear view of the container feeding system showing some component parts on the rear plate (bottom side) of the support frame assembly.

The four worm block assemblies 110 are mounted at spaced-apart locations around feeder tube openings 40 and 44, with most parts positioned or situated between the front and rear steel plates 22 and 28. Each worm block assembly 110, in its assembled state, as shown in FIG. 12, has a timing pulley shaft 126 inside the timing pulley 128. The pivot arm spacer 116 is connected to one end of the timing pulley shaft 126; and the timing pulley lock 132 is connected to the timing pulley hub 122 which is connected to the other end of the timing pulley shaft 126. As shown in FIGS. 6, 7, and 12, cylinder pivot arm 114 is connected to the pivot arm spacer 116, such that both spacer 116 and pivot arm 114 are on the bottom side 32 of rear plate 28. The spacer 116 protrudes through one of the pivot arm openings 76 of rear plate 28. The timing pulley 128 protrudes through one of the timing pulley openings 74 of front plate 22.

The pivot arm spacers 116 serves two functions. The first function of spacers 116 is to raise the cylinder pivot arms 114 to the correct height. The second function of spacers 116 is to act as a centering ring for the worm block assemblies 110, as it allows the worm block assemblies 110 to rotate on their axis, but prohibits unwanted side to side movement or play. The pulley hub spacers 124 primary purpose is to set the correct height for the timing pulley hubs 122 above the top surface 30 of front plate 22.

At the other end of worm block housing 112 worm shaft 120 is inside the other worm drive pulley 130*b* and the worm spacer/stop 118 and the worm shaft 120 drives the container-engaging worm members 222 to 228. The worm spacers/stops 118 and worm members 222 to 228 have timing pin openings 138 and 234 for receiving a lock-key timing pin 136 which aligns the correct positioning of the container-engaging worm members 222 to 228. In this way, when the worm members 222 to 228 are backed away (i.e., the pneumatics 204 are disengaged), spacers 118 stop the worm block assemblies 110 at their outer most position. The pulley timing belt 134 is located around the central hub of worm drive pulleys 130*a* and 130*b*.

The worm-block assemblies 110 serve two independent functions for the operation of feeding system 10. The first function is that the worm block assemblies 110 incorporate a belt and pulley system 134 to transfer any intended motion from the motor drive shaft 67 to drive the worm members 222 to 228, as depicted in FIGS. 12 to 15. This transfer of motion is transferred through the following members: through motor drive 13 of printing press 12, motor drive shaft 67, motor drive pulley 69, motor drive belt 168, timing pulley 128, first worm drive pulley 130*a*, worm drive timing belt 134, second worm drive pulley 130*b*, worm shaft 120, to drive container-engaging worm members 222 to 228 which rotate a single plastic container 14 which then moves to the mandrel of the printing press 12 for dry-offset printing of the exterior wall of the container 14.

Figure 16:
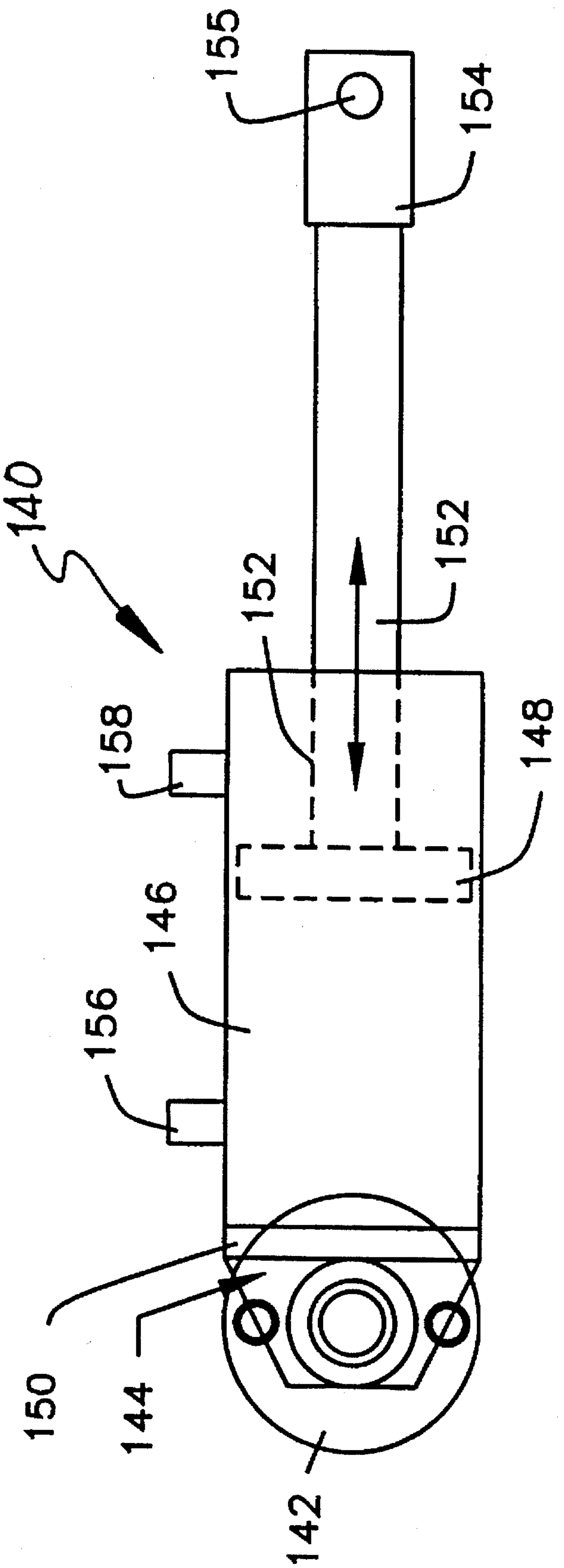
FIG. 16 is a top view of the cylinder pivot assembly showing its component parts in their assembled positions.
Figure 19:
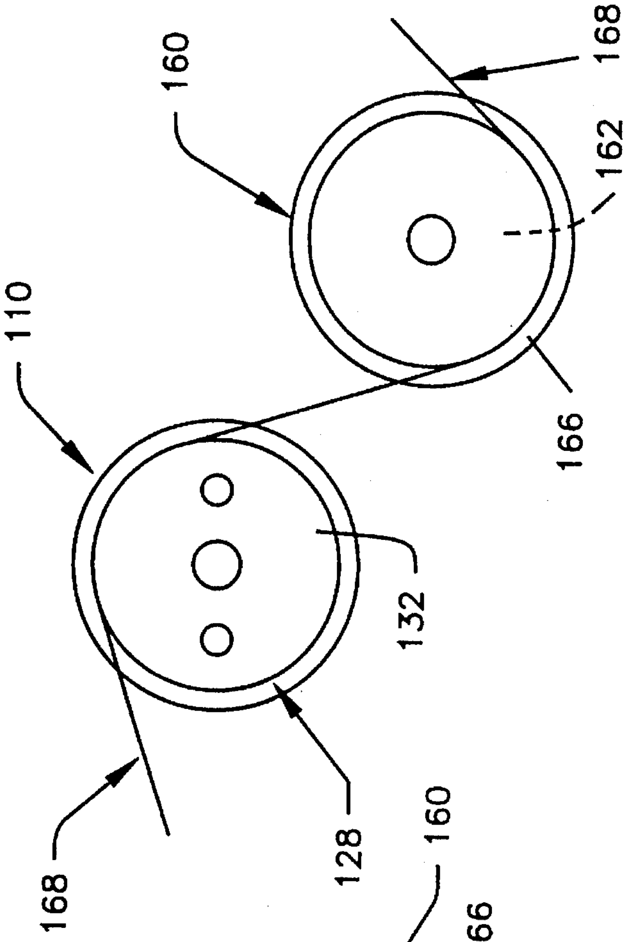
FIG. 19 is a top view of the timing pulley, the idler pulley and timing belt depicted in a proper position relative to each other which shows a correct wrap-around.

As shown in FIGS. 12 and 16, the second function of the worm-block assemblies 110 is to rotate on fixed shaft axis 126 to move the container-engaging worm members 222 to 228 between an engaged and disengaged position with feeder tube 92, in order to adjust the worm members 222 to 228 to the diameter of container 14. The cylinder pivot assembly 140 which moves the worm block assemblies 110, rotates on the cylinder pivot block 144 freely in order to allow for the fixed range of motion while cylinder arm 152 moves in or out of cylinder 146 to rotate the worm block assembly 110 on fixed axis 126.

As described below, when the worm-block assembly 110 is in use (this is represented by the solid line in FIG. 16), the pneumatic air system assembly 170 is switched ON (or in the engaged position 202), such that worm members 222, 224, 226, and 228 are engaged with the feeder tube 92 and the plastic container 14 simultaneously. When the pneumatic air system 170 is switched OFF to position 204 (represented by the dotted line in FIG. 16), the worm-block assembly 110 freely rotates away from the center of the feeder tube openings 40 and 44 to the disengaged position 204.

CYLINDER PIVOT ASSEMBLY 140

Each of the four cylinder pivot assemblies 140, as depicted in FIGS. 6, 7, and 16, moves one of the four worm blocks 112 between a first position 202 engaged with the feeder tube 92 and a second position 204 disengaged with the feeder tube 92. As shown in FIG. 16, each pivot assembly 140 includes a cylinder pivot stud 142, a cylinder pivot block 144, a compression cylinder 146, a piston head 148, a compression cylinder arm 152, and a clevis component 154. The cylinder pivot stud 142 is fixedly attached to the bottom side 32 of rear plate 28 via pivot stud bolts 84 by way of the plurality of paired sets of pivot stud openings 82*a* through 82*d*. The cylinder pivot block 144 swivels in place from the pivot stud 142 setting; and pivot block 144 is integrally connected to the rear wall 150 of compression cylinder 146. Also, attached to the compression cylinder 146 are a pair of miniature pneumatic airflow control ball valves 156 and 158 for the pneumatic outstroke and instroke compression of air by a piston head 148 within compression cylinder 146, as depicted in FIGS. 16 and 20. The compression cylinder arm 152 moves inwardly and outwardly when piston head 148 is stroking, as depicted in FIGS. 6, 7, 16, and 20. The cylinder clevis 154 is permanently and integrally affixed to cylinder arm 152. The clevis 154 is detachably connected to the cylinder pivot arm 114 via a clevis pin 155. The four cylinder pivot assemblies 140 are centrally located around feeder tube opening 44 on the bottom side 32 of rear plate 28 of feeder system 10.

The primary function of the cylinder pivot assembly 140 is that it drives worm block assemblies 110 and allows the compression cylinder 146 to pivot freely, when arm 152 is stroking in and out, about fixed axis 126 by way of cylinder pivot block 144, as shown in FIG. 6 of the drawings.

FIG. 6 also shows worm block assembly 110 and cylinder pivot assembly 140 in the engaged position 202 (pneumatics ON position); and worm block assembly 110 and cylinder pivot assembly 140 in the disengaged position 204 (pneumatics OFF position), which shows the interaction of the two assemblies 110 and 140.

IDLER PULLEY ASSEMBLY 160

There are five idler pulley assemblies 160, as depicted in FIGS. 1, 3, 4, 5, 19, and 24. Each includes idler pulley studs 162, a take-up idler pulley 164, idler pulleys 166*a* to 166*d* and a timing pulley belt 168. The idler pulley studs 162 are fixedly attached to the top side 24 of front plate 22 via pivot stud bolts 84 by way of the plurality of paired sets of pivot stud openings 82*a* through 82*d*, except for one idler pulley stud 162 which is used in conjunction with the take-up idler pulley 164 via a pair of pivot stud bolts 84 being attached to the pivot stud slot openings 48. The take-up idler pulley 164, by moving in slots openings 48, is used to tighten the timing belt 168 to a sufficient tension. The five idler pulley assemblies 160 are mounted at spaced-apart locations around feeder tube opening 40 on the top side 24 of front plate 22 of feeder system 10.

Figure 15:
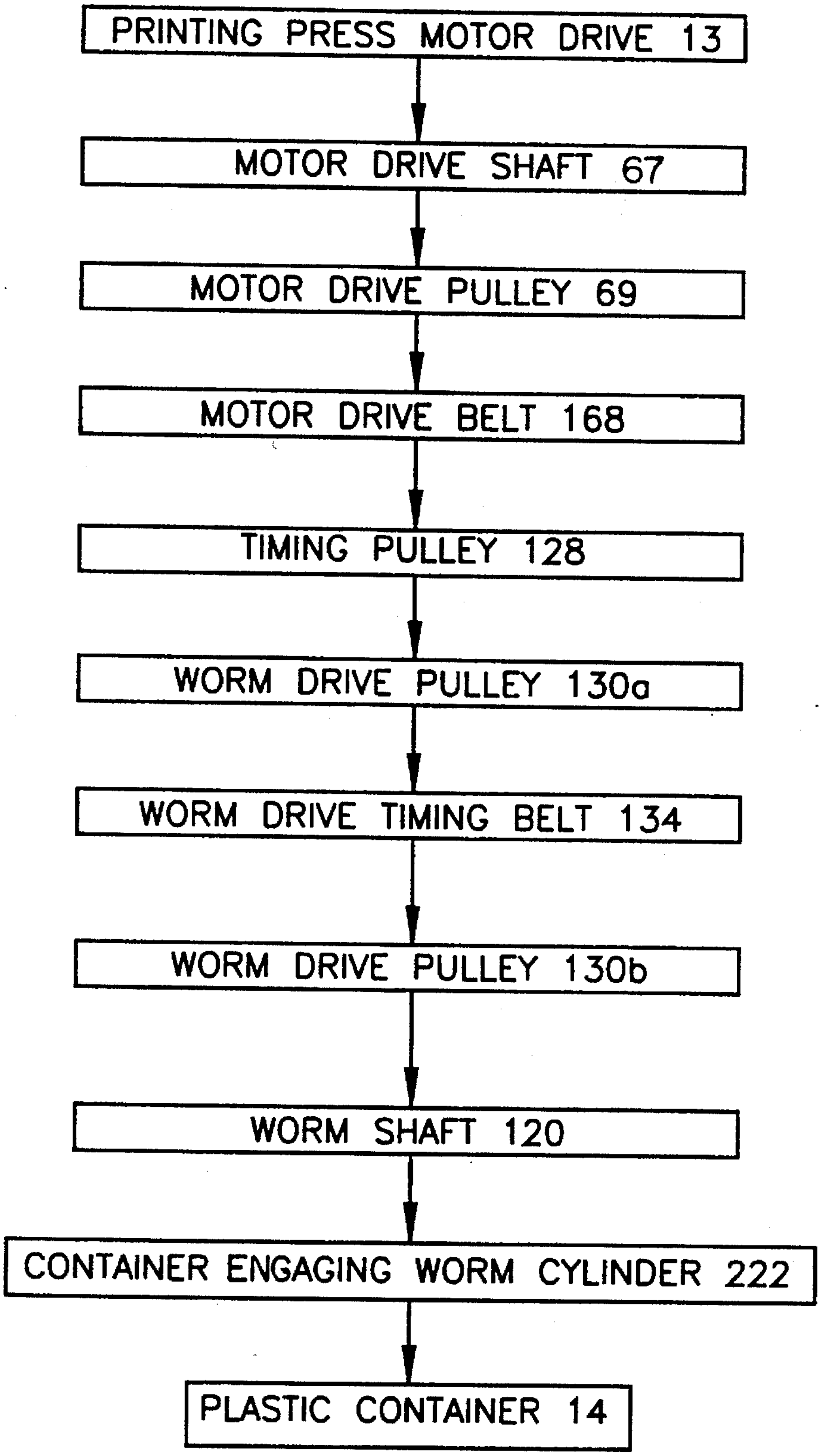
FIG. 15 is a flow chart showing the transfer of motion sequence from the motor drive to the container engaging cylinder worm which moves each plastic container to the printing press.
Figure 18:
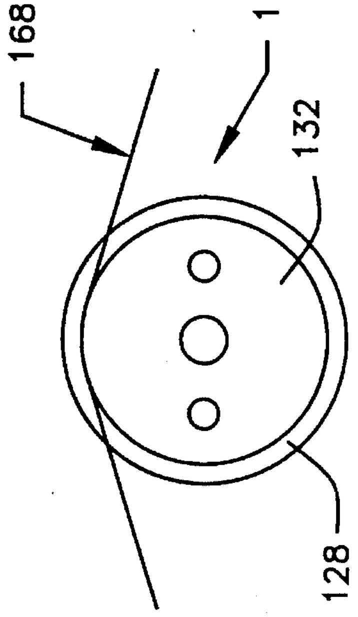
FIG. 18 is a top view of the timing pulley and timing belt without an idler pulley in place which shows insufficient wrap-around.
Figure 17:
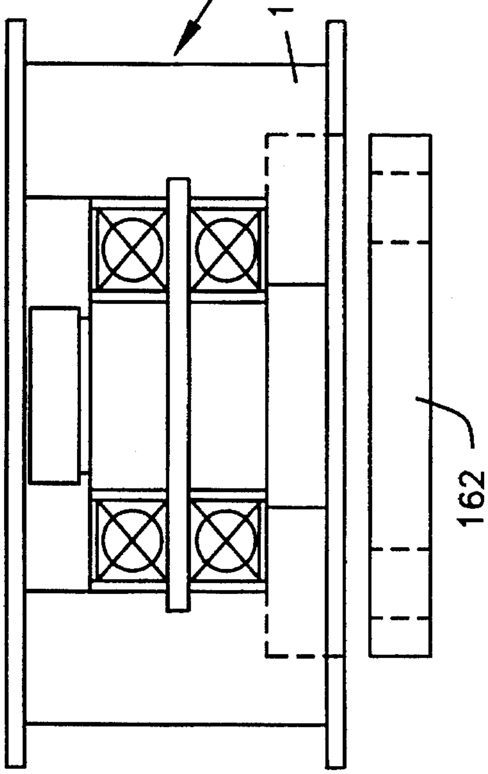
FIG. 17 is a side view of the idler pulley assembly showing its component parts in their assembled positions.

The idler pulley assembly 160 provides an important mechanical function, as the idler pulleys 164 and 166 create a sufficient wrap-around and positive drive for the motor drive timing belt 168 which drives the timing pulleys 128. As shown in FIG. 15, the motor drive belt 168 is used to transfer the intended motion from the motor drive shaft 67 to the timing pulleys 128, which in turn transfer the motion to the worm members 222, 224, 226, and 228 via the worm block assemblies 110. If there is insufficient wrap-around, as depicted by FIG. 18, the belt 168 will drive timing pulleys 128, and in turn, worm members 222 to 228 will slip and move hesitantly, as there is not enough power to drive the worm members 222 to 228 as intended. The idler pulleys 164 and 166*a* to 166*d* are placed in strategic locations on side 24 of front plate 22, such that the idler pulley locations are designed to create enough wrap-around for the belt 168 to positively drive the timing pulleys 128 in a proper fashion, as shown in FIGS. 1, 3, 4, 5, 13, 17, 19, and 24.

PNEUMATIC AIR ASSEMBLY 170

The pneumatic air assembly 170, depicted in FIGS. 1 to 7 and 20, 21, 24, 25, and 26, includes a main air supply 172 such as a conventional air compressor; a pneumatic air switch 174; an air-feed manifold 196 or 496 for feeder tube assemblies 90 or 390; an air-feed manifold 186 for the cylinder pivot assemblies 140; a plurality of air-inlet air lines 200; a plurality of air-inlet nozzles 188 and air lines 190 for the piston 146 outstroke being connected to the air-feed manifold 186; and a plurality of air-inlet nozzles 192 and air lines 194 for the piston 146 instroke, also connected to the air-feed manifold 186.

As shown in FIGS. 6 and 20, the air switch 174 has a pneumatic four-way valve having a two position setting: position 202 for engaging (pneumatics ON) and position 204 for disengaging (pneumatics OFF) the pivot arms 152 of the cylinder pivot assemblies 140. The air switch 174 has a main port inlet connection opening 176 for receiving inlet air, an outlet air nozzle connection opening 178 for the piston outstroke inlet air, an outlet valve opening 180 for piston outstroke exhaust air, an outlet air nozzle connection opening 182 for the piston instroke inlet air, and an outlet valve opening 184 for piston instroke exhaust air.

When the pneumatic air assembly 170 is in the ON position 202, air switch 174 allows air flow in from the main port opening 176 through valve opening 182 which feeds air through manifold inlet air nozzle openings 188 to outstroke air lines 190 which then feeds the air into the pneumatic airflow control valve 156. When valve 178 is in the open position, valve 182 is in the closed position, such that outlet exhaust valve 180 is in the closed position, and outlet exhaust valve 184 is in the open position. This results in the air being let into cylinder 146 through valve 156 which then engages the piston head 148 and pushes it outwardly. This results in the worm block assemblies 110 being moved to the engaged position 202, as shown in FIG. 16. As piston head 148 pushes outwardly, the instroke air within cylinder housing 146 is displaced through control valve 158 and outlet exhaust valve 184 of air switch 174.

Conversely, when the pneumatic air system 170 is in the OFF position 204, air switch 174 lets air flow in from the main port opening 176 through valve opening 182 which feeds air through manifold inlet air nozzle openings 192 to instroke air lines 194 which then feeds the air to the pneumatic airflow control valve 158. When valve 182 is in the open position, valve 178 is in the closed position, such that outlet exhaust 184 is in the closed position, and outlet exhaust valve 180 is in the open position. This results in the air being let in through valve 158 which then engages the piston head 148 and pushes it inwardly, such that piston arms 152 move inwardly. This results in the worm block assemblies 110 being moved to the disengaged position 204, as shown in FIG. 16. As piston head 148 pushes inwardly, the outstroke air within cylinder 146 is displaced through control valve 156 and outlet exhaust valve 180 of air switch 174.

The pneumatic air assembly 170 also supplies high velocity air for blowing-off of either the container 14 or cup 16 from feeder tubes 90 or 390. As depicted in FIGS. 2, 6, 20, 21, 25, and 26, air is supplied to feeder tube manifold 196 from air source 172 via inlet air line 200. Manifold 196 then disperses the air through manifold openings 198 to air line 200 to the four venturi jet arms 102 or 402 attached to feeder tubes 90 or 390 having air inlet connector openings 106 and 406 for air inlet air line 200. Each venturi jet arm 102 or 402 has a venturi jet nozzle aperture 104 or 404 to provide an angled air blow-off of container 14 or cup 16 from feeder tube 90 or 390.

The main air source 172 of pneumatic air system 170 is constantly ON and is only turned OFF when the main power supply of the printing press 12 is turned OFF.

CONTAINER ENGAGING CYLINDRICAL WORM ASSEMBLY 220

Figure 23:
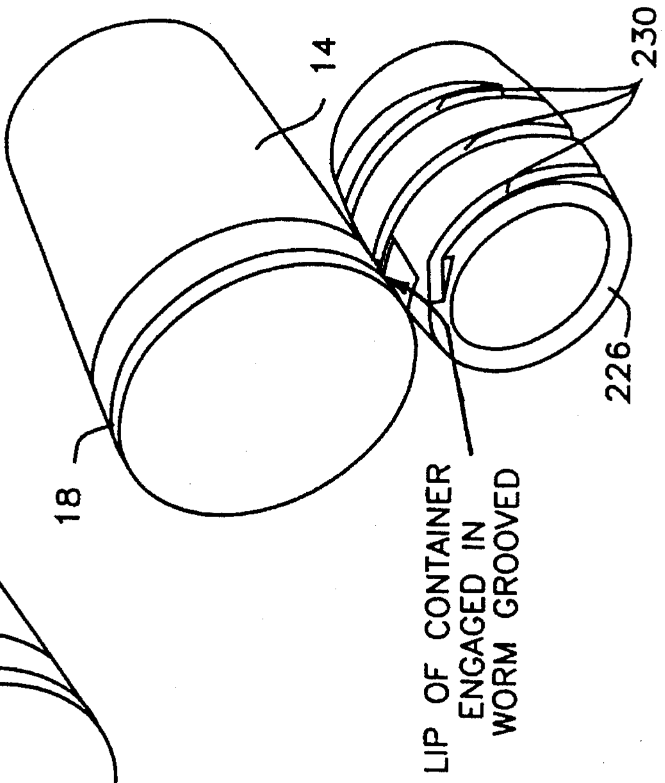
FIG. 23 is a perspective view of a single worm screw that has engaged the lip of the container in its spiral groove.
Figure 22:
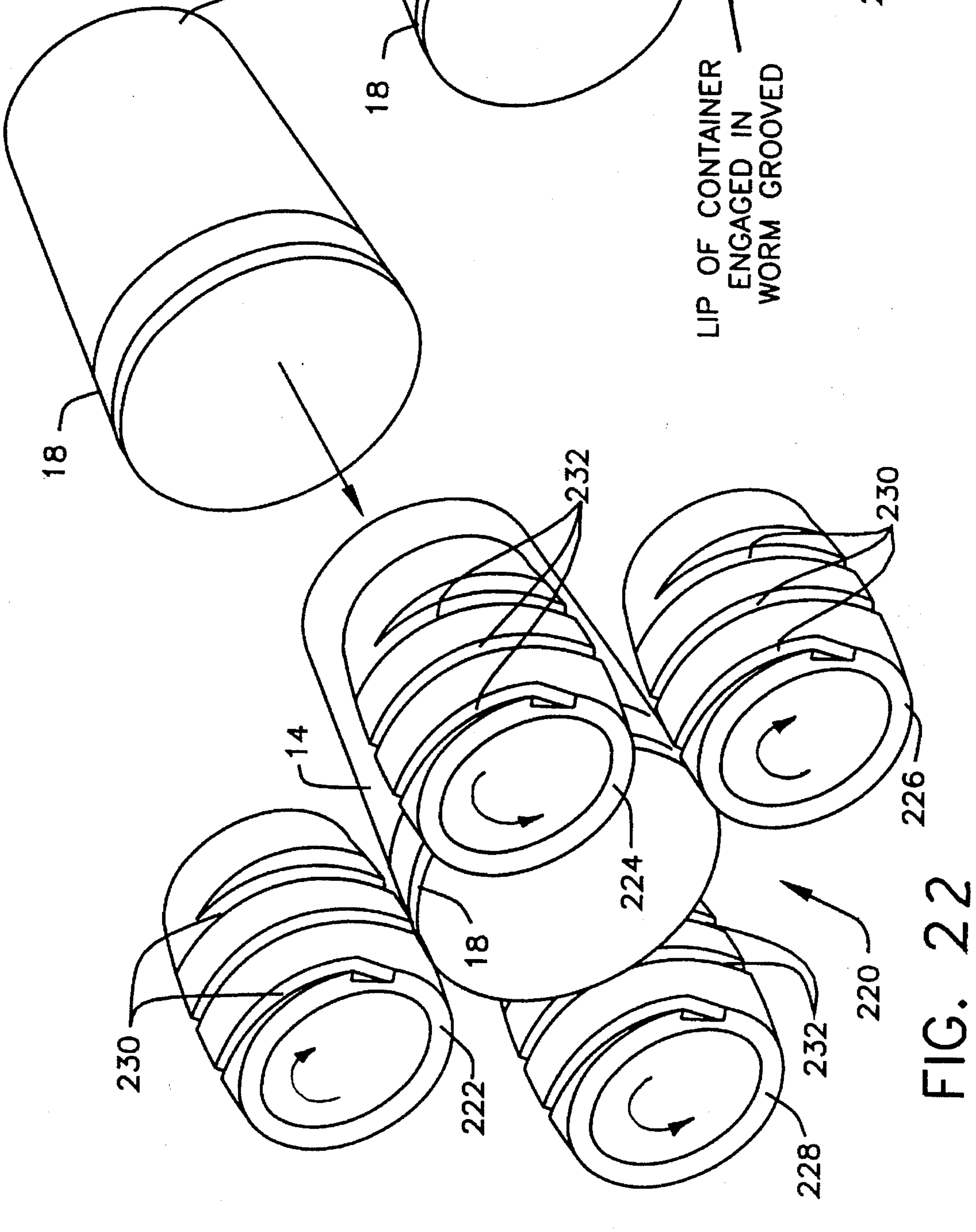
FIG. 22 is a perspective view of the container engaging worm screw assembly in contact with a container for moving that container forward.
Figure 24:
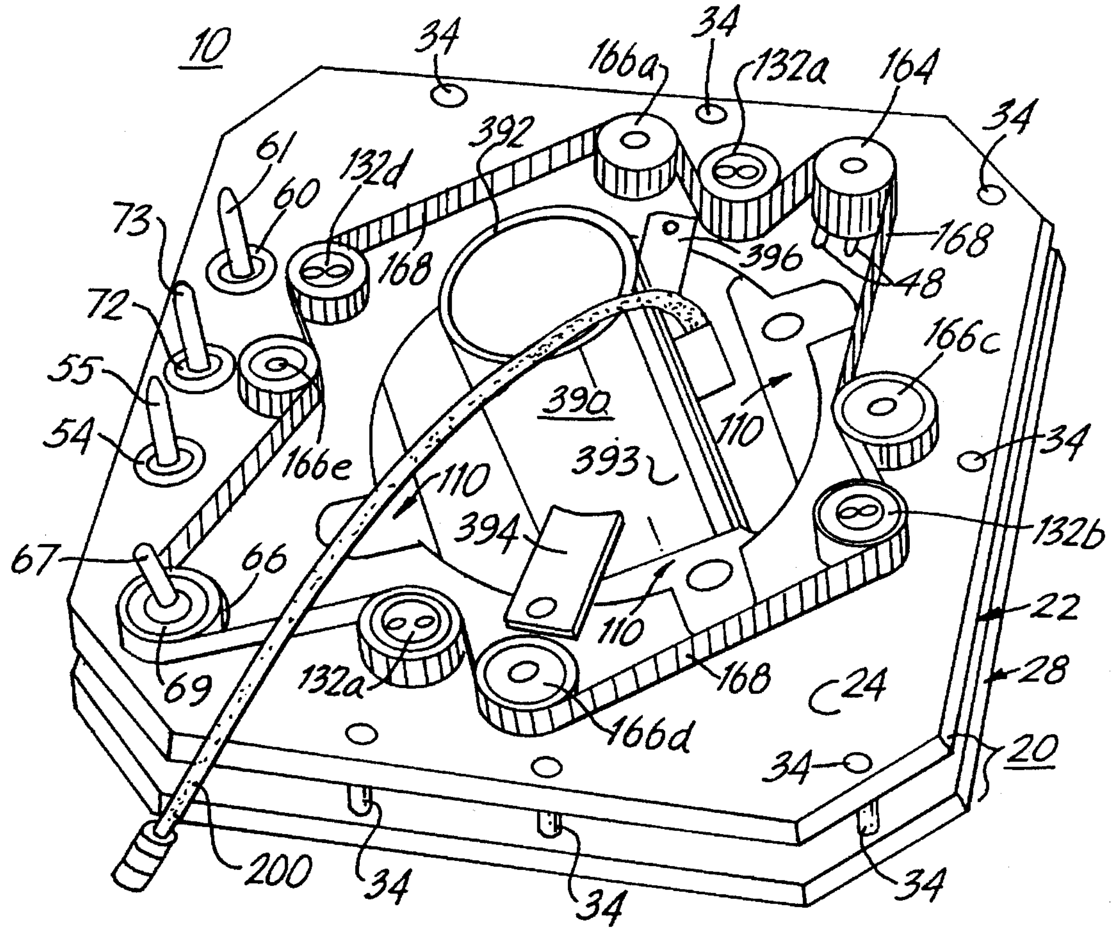
FIG. 24 is a top perspective view of the container feeding system of the present invention showing an alternate embodiment of the assembled apparatus with cups being in the cup feeder tube.

As shown in FIGS. 22 and 23 the container-engaging worm assembly 220 includes a plurality of four worm members 222, 224, 226, and 228 being cylindrical, hollow and made of aluminum. These worm members 222 to 228 each include clockwise and counter-clockwise spiral grooves 230 and 232 for engaging the lip or bead 18 of a plastic container 14 or cup 16 and moving only a single container 14 or cup 16 at a time toward the mandrel of the printing press 12.

Each worm member 222 to 228 has a timing pin opening 234 for receiving timing pin 136 which is connected to the worm spacer 118 and timing pulleys 128 which give the correct simultaneous movement of the spiral grooves 230 and 232 for engaging the lip 18 of container 14 or cup 16. As shown in FIG. 22, worm members 224 and 228 move in a clockwise motion having clockwise spiral grooves 230, while worm members 222 and 226 move in a counter-clockwise motion having counter-clockwise spiral grooves 232. Each worm member 222 to 228 is unique in design and cannot be interchanged with each other because of the position location of timing pin opening 234 and spiral grooves 230 and 232 used. Each worm member 222 to 228 measures 3⅛ inches in diameter by 2½ inches in length.

DETAILED DESCRIPTION OF ALTERNATE EMBODIMENTS

An alternate embodiment 300 of the container feeding system 10 of the present invention is depicted in FIGS. 5, 6, 24, 25, and 6. All aspects of these alternate embodiments of the feeding system 300 are the same as the preferred embodiment of the feeding system 10, except for the shape and size of the feeder tube 90 and worm members 222 to 228, which are different.

SECOND EMBODIMENT 300

Figure 25:
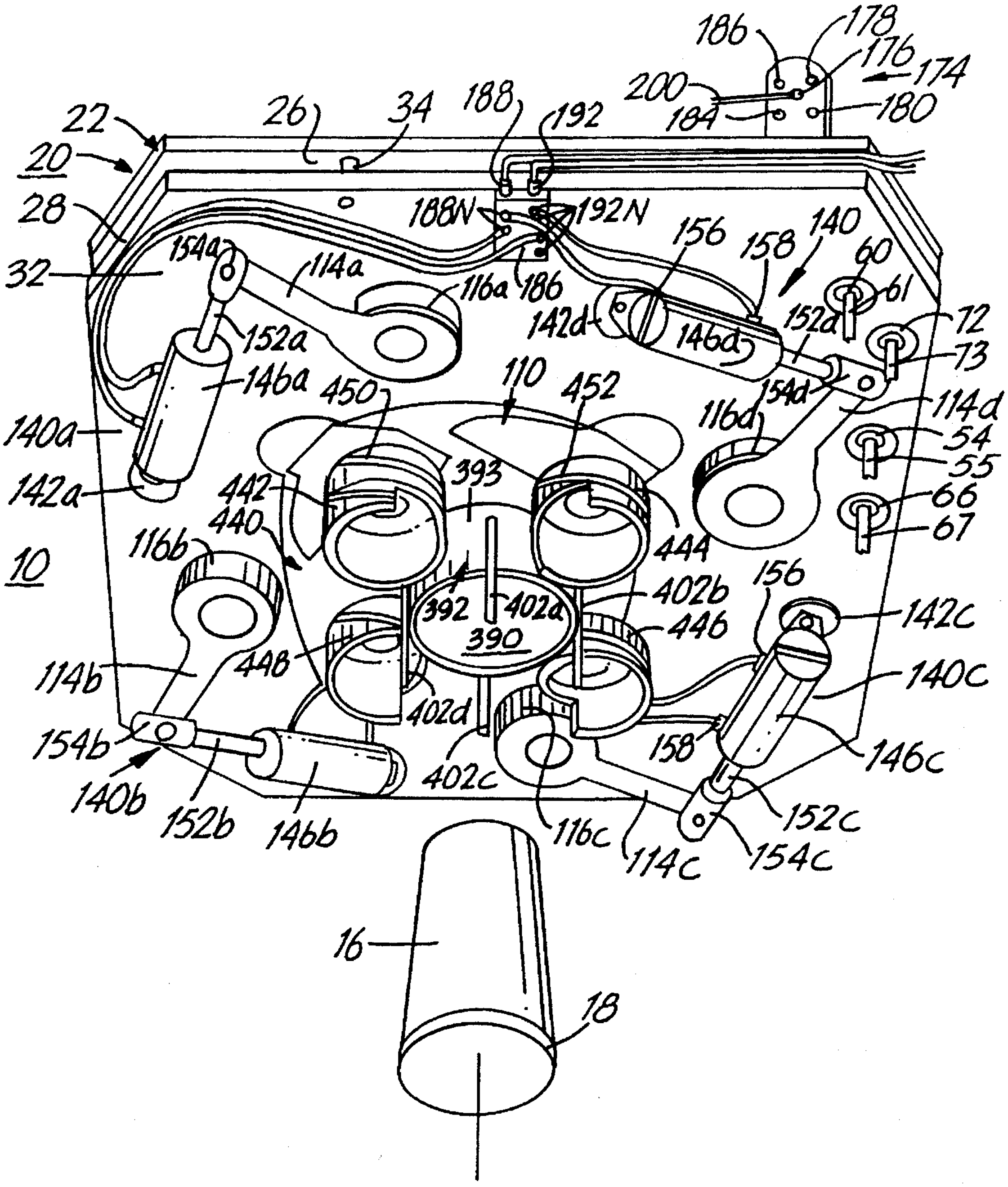
FIG. 25 is a rear perspective view of the container feeding system of the present invention showing an alternate embodiment depicting the cup being fed out from the cup feeder tube in the assembled condition.

The cup feeding system 300 and its component parts of the second embodiment are represented in FIGS. 25 and 26. The feeding system 300 includes a feeder tube assembly 390 that has an elongated cylindrical cup feeder tube 392 having integrally connected left and right attachment support arms 394 and 396 being at one open end. Support arm mounting openings 398 and 400 for support arm bolts 88 are mounted in support arm openings **86*a* and 86*b* on front plate 22. Correspondingly, the support arm openings 398 and 400 of support arms 394 and 396 are aligned with the support openings 86*a* and 86*b* on front plate 22. They are attached by two support arm bolts 88 which firmly attaches the cup feeder tube 390 to the front plate 22, as shown in FIG. 4B. Located at the other open end of feeder tube housing 392 are four venturi jet arms 402, being equally spaced around feeder tube housing 392, as shown in FIG. 26. Each venturi jet arm 402 has a venturi jet nozzle aperture 404 for an angled air blow-off of a cup 16 from the feeder tube assembly 390; and an air-inlet connector opening 406 for an air-inlet air line tube 200 for supplying the blow-off air to cup 16, as depicted by FIGS. 25 and 26**.

In feeding system 300, feeder tube 390 has a smaller diameter and a longer length than feeder tube 90 to accommodate a more slender cup 16. The feeding system 300 also has a plurality of different size, right and left-hand cup-engaging worm members 442, 444, 446, 448 having spiral grooves which are clockwise 450 and counter clockwise 452, as depicted in FIG. 25, showing the cup-engaging worm assembly 440. Worm members 442 and 446 rotate in a counter-clockwise motion, while worm members 444 and 448 rotate in a clockwise motion, such that spiral grooves 452 and 450 of the worms 442 to 448 engage the lip 18 of cup 16 to move it to a forward position, where the cup 16 is blown off by jet air blasts from jet nozzles 404. Each worm 442 to 448 is unique in design and cannot be interchanged with each other or other worms of different cup sizes because of the timing pin opening 454 and the location of spiral grooves 450 and 452 which are machined in each of the aforementioned worms for the cup 16 being used. The cup feeder tube 392 for this alternate embodiment 390 measures a 10 inches in length and has a diameter opening 3⅜ inches.

FURTHER ALTERNATE EMBODIMENTS

Further alternate embodiments (they are not depicted by drawings) are available, where the present invention of the feeder system 10 can be used for other shapes and sizes of containers having different geometric configurations, such as square, cubic, rectangular, triangular or oval. To accommodate such configurations, it is only necessary to change the shape of the feeder tube 90 or 390 from a round cylindrical tube to a configuration of the required shape of the container as previously mentioned above. Depending upon container or cup shape and sizing, the feeder tube dimensions can vary to different lengths and diameters.

The worm members 222 to 228 or 442 to 448 may also have to be modified in size, shape, and spiral grove configuration 230, 232 or 450, 452 to accommodate the different sizes and shapes of the containers being printed. These alternate worm engaging members would also not be interchangeable with each other or other worm members of a similar size or shape container because of the different groove configuration and timing pin specifications of its specific location on each of the worm members.

OPERATION OF THE PRESENT INVENTION

In operation, the adjustable container feeding system 10 of the preferred embodiment and 300 of the alternate embodiment perform in a similar manner, as depicted in FIGS. 1, 2, 15, 20, 21, 22, 23, 24, 25, and 26.

The operation of feeding system 10 or 300 starts with the operator retracting the worm block assemblies 110 to a disengaged position 204, as shown in FIG. 16. This is done by switching the air switch 174 to an instroke mode (pneumatics are OFF 204), as shown in FIG. 21 of the drawings.

Figure 5:
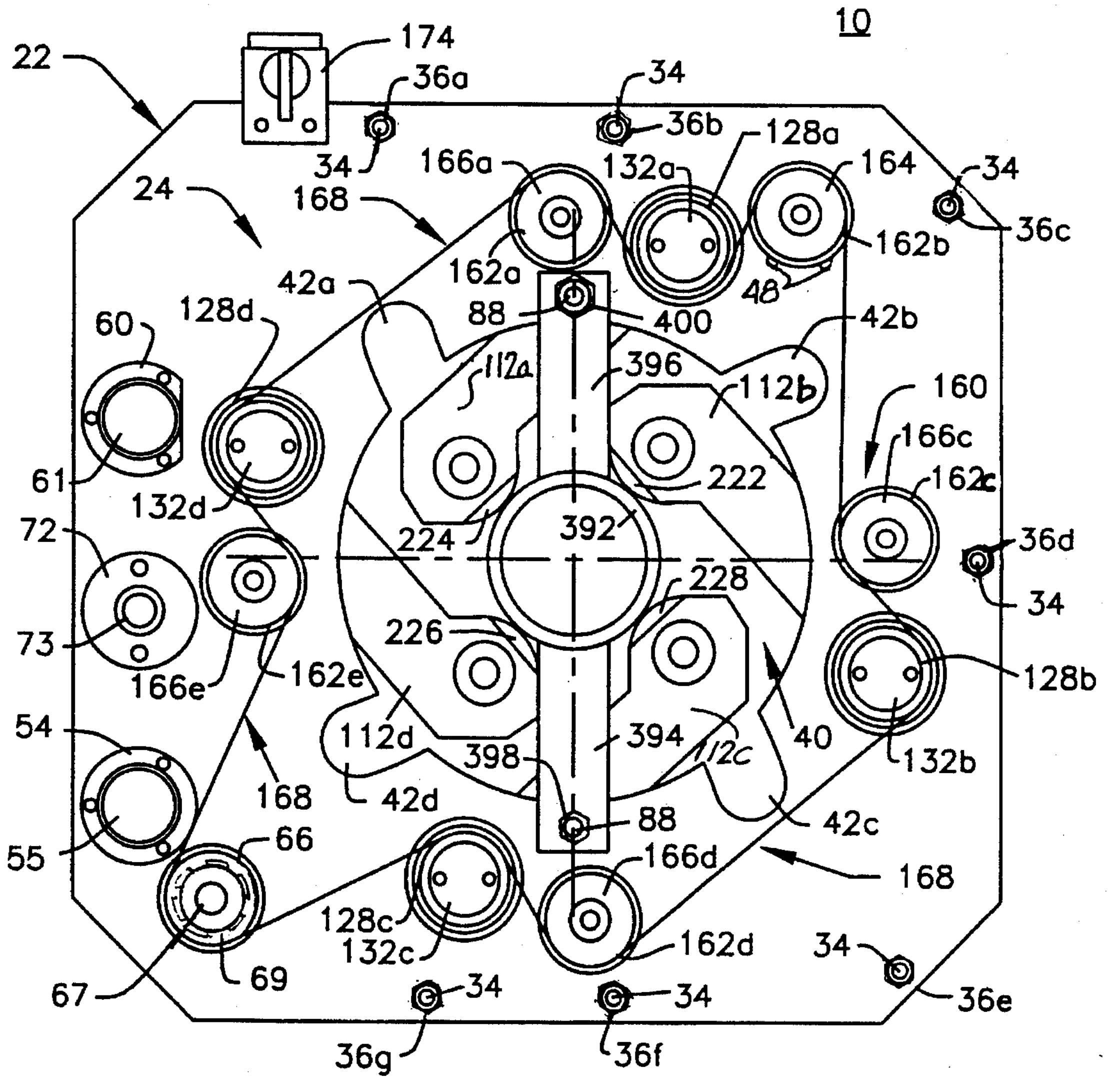
FIG. 5 is a top view of the container feeding system showing the cup feeder tube of the alternative embodiment and other component parts on the front plate (top side) of the support frame assembly.

The operator then disassembles the air-inlet air lines 190, 194, and 200 from the manifolds 186, 196; the ball valves 156, 158; and the air actuator 174. Next, the operator will continue to initiate the start-up of the operation of feeder system 10 or 300 by adjusting for a particular container diameter by installing an appropriate feeder tube assembly 90 or 390. The operator will select a feeder tube assembly 90 or 390 that is pre-sized for each container 14 or cup 16 to be used. Each feeder tube housing 92 or 392 has an integrated blow-off system of venturi-jet arms 102 or 402 affixed to the aforementioned feeder tube housings 92 or 392. The feeder tube housing 92 or 392 is then inserted into the support frame assembly 20 through receiving openings 40 and 44 of front and rear plates 22 and 28, and between the four worm members 222 to 228 or 442 to 448. The feeder tube housing 92 or 392 is then bolted down by bolts 88 which attach the support arms 94, 96 or 394, 396 to front plate 22 via support arm openings **86*a* and 86*b*, as shown in FIGS. 4 and 5. Different size feeder tube assemblies 90, 390 are utilized for different sizes and shapes of containers 14 or cups 16**.

Next, the operator will reattach or re-plug in all air-inlet air lines 200 to both the feeder tube air manifold 196 and its' manifold nozzle openings 198; and to the plurality of venturi jet arms '102 or 402 connector openings 106 or 406. The operator will also reconnect all air-inlet air lines 190, 194, and 200 to the cylinder pivot assembly air manifold 186 and its manifold nozzle openings 188,188N, 192, and 192N; to the cylinder pivot assemblies 140 outstroke and instroke airflow control ball valves 156, 158; and to the air actuator 174 and its connector openings 176, 178, 180, 182, and 184, as depicted in FIGS. 7 and 20. With all of the above air-inlet air lines 190, 194, and 200 reconnected by the operator, the pneumatic air system 170 is activated again and is ready for operational use (it should be noted that main air supply 172 is always ON when printing press 12 is ON). Thus, with the feeder tube housing 92 or 392 in its proper location and with the worm assemblies 220 or 440 in the open or backed away position 204 (pneumatic system is OFF 204), the feeder system 10 or 300 can be now reactivated by the operator.

The pneumatic air assembly system 170 is then reactivated by the operator, who switches the air actuator 174 to an outstroke mode (pneumatics are ON 202), as depicted in FIGS. 6 and 20. This automatically moves the worm members 222 to 228 or 442 to 448 in towards the feeder tube housing 90 or 392 until the worm members are around and are touching the outer wall 93 or 393 of feeder tube housing 90 or 392, thereby adjusting the worm members 222 to 228 or 442 to 448 quickly and easily for the diameter of the container 14 or cup 16 chosen. Thus, the pneumatic worm block assemblies 110 have effectively eliminated operator error. If there is a jam during an operational run, the operator quickly retracts the worm to the disengaged position by simply activating assemblies 220 or 440 the pneumatic air switch 174 of air system 170 to an instroke position 204. The operator then removes the jammed containers 14 or cups 16, and then automatically re-engages the worm members 222 to 228 or 442 to 448 by reactivating air switch 174 to an outstroke position 202. The worm assemblies 220 or 440 will always return to the same exact position on the outside wall 93 or 393 of feeder tube assemblies 90 or 390 when reengaged.

The above steps summarize the start-up mode for the feeding system 10 or 300. The operator can now initiate the production run of a particular container 14 or cup 16 size for indicia printing by an off-set dry printing press 12. The operator then, by hydraulic means, places the support frame assembly 20 on the appropriate alignment shafts 55, 61, motor drive shaft 67, and height adjustment shaft 73 via bushings 54, 60; drive shaft block 66 and adjustment block 72. The alignment shafts 55, 61 give the support frame 20 the correct alignment of the feeder tube assemblies 90 or 390 to the mandrel (not shown) of the printing press 12. The operator adjusts the height adjustment shaft 73 to a correct distance of support frame assembly 20 from the mandrel which is dependent on the container 14 or cup 16 length. The operator then keys the motor drive shaft timing pulley 69 with the motor drive shaft 67, and this ultimately sets the timing of the worm assemblies 220 or 440. The individual worm members 222 to 228 or 442 to 448 turn-in their correct simultaneous clockwise and counter-clockwise movements to engage a lip 18 of container 14 or cup 16 in the spiral grooves 230 and 232 or 450 and 452 which then moves a single container 14 or cup 16 forward towards the mandrel, as depicted by FIGS. 22 and 23.

Figure 14:
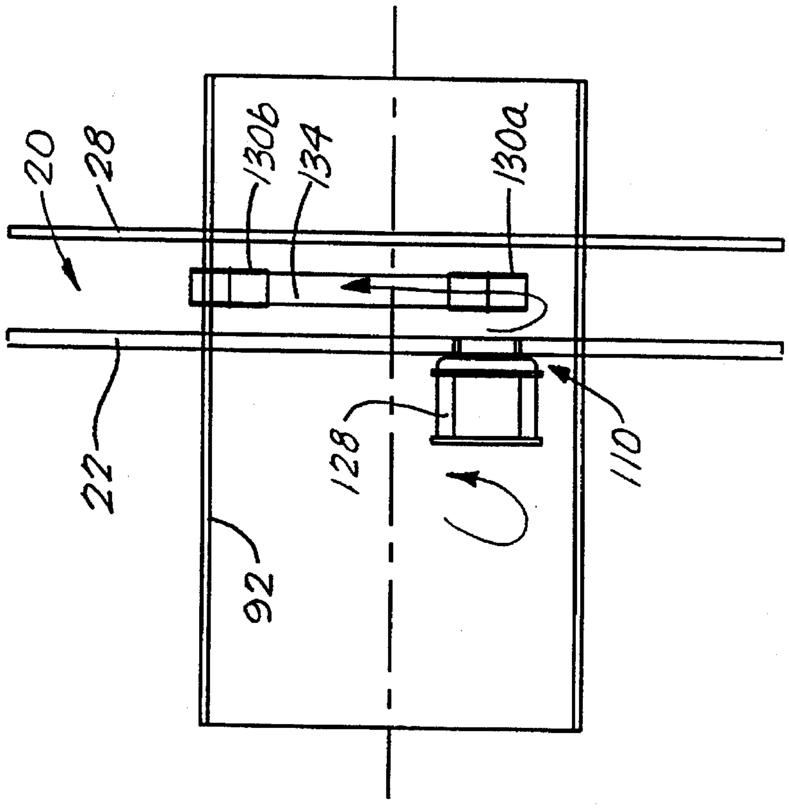
FIG. 14 is a side view of support frame assembly showing the direction of movement for the timing pulley and timing pulley belt.
Figure 13:
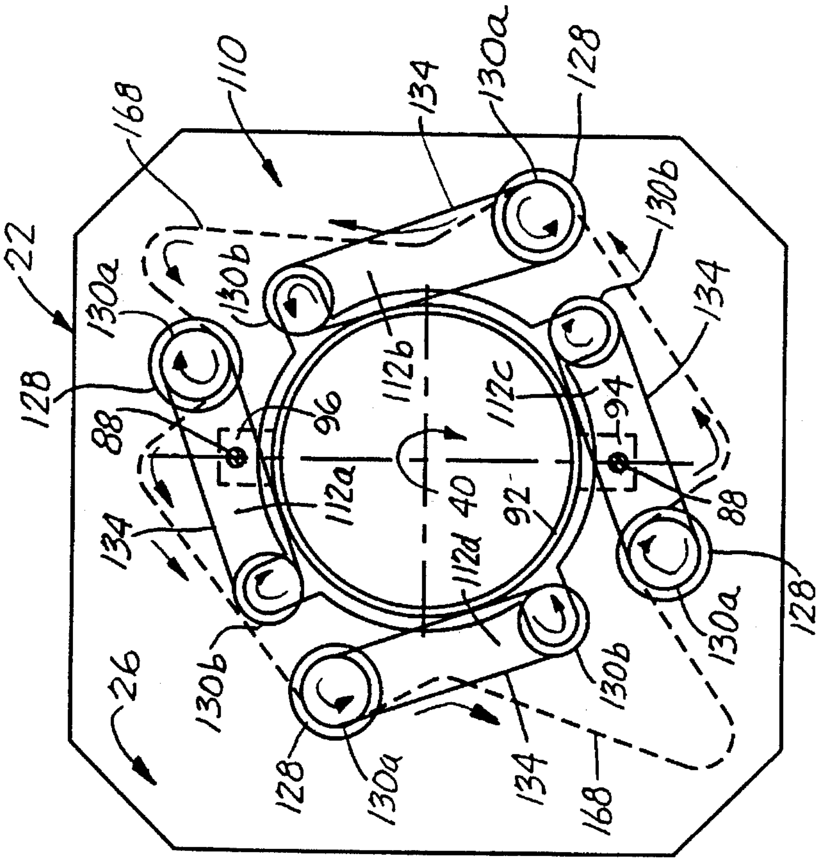
FIG. 13 is a rear view of the front plate showing the direction of movement for the four timing pulley belts and the single idler pulley belt.

The operator then loads a plurality of containers 14 or cups 16 to the feeding tube assembly 90 or 390 for initiation of the printing production run. FIG. 15 shows schematically the motion sequence of the feeding system 10 or 300 with the switching ON of the printing press motor 13 by the operator which starts-up the production run. The motor drive 13 turns motor drive shaft 67 which then turns the timing pulley 69 which turns the timing pulley belt 168, as depicted by FIG. 13. The timing belt 168 then simultaneously moves the four worm drive pulleys **130*a* in their clockwise and counter-clockwise movements, as depicted by FIGS. 13 and 14. This clockwise and counter-clockwise motion is then transferred by a plurality of worm drive timing belts 134 to four worm drive pulleys 130*b* which in turn drives a plurality of worm shafts 120 in their correct sequenced motion, as shown in FIGS. 12 and 14. This worm shaft 120 motion is then transferred to worm members 222 to 228 or 442 to 448 which then in a simultaneous movement engages the lip or bead 18 of container 14 or cup 16 at the same time which then moves the lip 18 of container 14 or cup 16 forward via spiral grooves 230 and 232 or 450 and 452 one cup at a time, as shown in FIGS. 2, 22, 23, and 25. As the container 14 or cup 16 is released from the worm assemblies 220 or 440, a high velocity angled air stream is blown onto the container 14 or cup 16 from the jet nozzle apertures 104** or 404 which then blows the container 14 or cup 16 off the worm member 220 and moves it to the printing press 12 mandrel. The container 14 or cup 16 is now ready for printing indicia on the outside wall of container 14 or cup 16 by the dry off-set printing press 12. These operational steps, as shown in FIG. 15, are repeated until all of the containers 14 or cups 16 have been printed for that particular production run.

ADVANTAGES OF THE PRESENT INVENTION

Accordingly, it is an advantage of the present invention that it provides an automatic, adjustable and pneumatically integrated container feeding system for dry offset printing presses which can be utilized for different container sizes and shapes, with the primary benefits of increased efficiency due to lower maintenance and labor costs during changeovers for different container sizes and shapes.

Another advantage of the present invention is that it provides a container feeding system that utilizes an integrated pneumatic system which automatically adjusts for the container diameter chosen, thereby effectively eliminating operator error and variations for different container diameters.

Another advantage of the present invention is that it provides a container feeding system that minimizes down time and labor costs by enabling quick removal of jams.

Another advantage of the present invention is that it provides a container feeding system that minimizes changeover time and set-up time by automatically and simultaneously adjusting the position of the cup feeder-tube and cup-engaging worm members.

Another advantage of the present invention is that it provides for blow-off air jets that are integrally located on the feeder tube at the proper position, relative to the container, for ejecting a container from the feeder tube to the mandrel, thereby effectively eliminating operator error and minimizing scrap containers due to jams.

A further advantage of the present invention is that it provides a container feeding system that is simple to manufacture and assemble, and is also more cost efficient during operational use.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An apparatus for engaging and feeding containers to a printing press, comprising:

a) a support frame having a plurality of shafts mounted thereon;

b) a plurality of worm members mounted on said shafts and each having spiral grooves for engaging a bead of a container, said worm members being movable between a first position for engaging said bead and a second position disengaged from said bead;

c) a feeder tube mounted on said support frame for setting and controlling the location of said first position of said worm members and for supplying said containers to said worm members;

d) a plurality of worm block assemblies mounted within said support frame each including means for rotating one of said plurality of worm members while in said first position to simultaneously engage said bead to move said container forward relative to said feeder tube to the end of said spiral grooves;

e) means for injecting air at said container for transferring said container from the end of said spiral grooves to a mandrel for receiving said container for printing; and f) means for moving said worm block assemblies between said first and second positions.

2. An apparatus in accordance with claim 1, wherein said means for moving includes a plurality of cylinder pivot assemblies and a pneumatic air system for pivoting said cylinder pivot assemblies between a first and second position.

3. An apparatus in accordance with claim 2, wherein each of said cylinder pivot assemblies includes a cylinder, a piston cylinder arm, a piston head, and a cylinder pivot arm; and means for pivotally mounting said cylinder pivot assembly on said support frame.

4. An apparatus in accordance with claim 1, wherein each of said means for rotating includes first and second pulleys, a driving belt for driving said pulleys, and input and output shafts, said output shaft being connected to rotate one of said worm members.

5. An apparatus in accordance with claim 4, wherein said means for rotating includes a timing belt system having a plurality of timing pulleys and a plurality of idler pulleys for simultaneously rotating said worm members.

6. An apparatus in accordance with claim 1, wherein said support frame includes a front plate and a rear plate being spaced apart by a plurality of spacers.

7. An apparatus in accordance with claim 6, wherein said support frame includes means for mounting said feeder tube, said plurality of worm block assemblies, and said plurality of cylinder pivot assemblies.

8. An apparatus in accordance with claim 1, wherein said support frame has a plurality of shaft openings for receiving a plurality of shafts for alignment, for height adjustment, and for driving said worm block assemblies.

9. An apparatus in accordance with claim 2, wherein said pneumatic air system includes an air source supply, an air switch actuator having a plurality of valve inlet and outlet openings for supplying air to a manifold, and said manifold having a plurality of nozzle openings for supplying air to said cylinder pivot assemblies.

10. An apparatus in accordance with claim 3, wherein said piston cylinder has two air flow control valves for controlling the outstroke and instroke of said piston cylinder arm of said cylinder pivot assembly.

11. An apparatus in accordance with claim 5, wherein at least one of said plurality of idler pulleys is an idler take-up pulley for controlling slippage of said timing belt.

12. An apparatus in accordance with claim 1, wherein said worm members have a diameter, a length and a spiral groove configuration depending upon the size and shape of said container.

13. An apparatus in accordance with claim 1, wherein said feeder tube has a diameter, a length and a shape depending on the size and shape of said container.

14. An apparatus in accordance with claim 5, wherein said feeder tube is in the shape of a circle, oval, triangle or square.

15. An apparatus in accordance with claim 1, wherein said means for injecting air includes air jet arms and nozzles for injecting air at said container.

16. An apparatus in accordance with claim 15, wherein said nozzles for injecting air at said container are angled at 45° to said air jet arms.

17. An apparatus in accordance with claim 1, wherein said means for injecting air are mounted on said feeder tube for ejecting a container from within said feeder tube to said mandrel.

18. An apparatus in accordance with claim 4, further including a plurality of timing pins, each one for interconnecting one of said worm members and one of said worm block assemblies for controlling the simultaneous engagement of said worm members with the bead of said container.

* * * * *